US011373234B2

(12) United States Patent
Maiocco et al.

(10) Patent No.: US 11,373,234 B2
(45) Date of Patent: Jun. 28, 2022

(54) SYSTEM AND METHOD TO MANAGE DEPOSITS AND PAYMENTS FOR VARIABLE WEIGHTED AND VARIABLE PRICED AGRICULTURAL PRODUCTS

(71) Applicant: BARN2DOOR, INC., Seattle, WA (US)

(72) Inventors: Janelle Joy Maiocco, Seattle, WA (US); Jeff A. Ma, Seattle, WA (US); Samuel James San Nicolas, Seattle, WA (US); Eli Spiegel, Woodinville, WA (US)

(73) Assignee: BARN2DOOR, INC., Seattle, WA (US)

( * ) Notice: Subject to any disclaimer, the term of this patent is extended or adjusted under 35 U.S.C. 154(b) by 0 days.

(21) Appl. No.: 16/684,953

(22) Filed: Nov. 15, 2019

(65) Prior Publication Data

US 2020/0160425 A1   May 21, 2020

Related U.S. Application Data

(60) Provisional application No. 62/768,001, filed on Nov. 15, 2018.

(51) Int. Cl.
*G06Q 30/00*        (2012.01)
*G06Q 30/06*        (2012.01)
(Continued)

(52) U.S. Cl.
CPC ..... *G06Q 30/0635* (2013.01); *G06Q 30/0206* (2013.01); *G06Q 30/0283* (2013.01);
(Continued)

(58) Field of Classification Search
CPC .......... G06Q 30/0635; G06Q 30/0206; G06Q 30/0283; G06Q 30/0623; G06Q 30/0641; G06Q 50/02
See application file for complete search history.

(56) References Cited

U.S. PATENT DOCUMENTS 8,019,633 B2   11/2011   Stroman et al.
2002/0120554 A1   8/2002   Vega
(Continued)

OTHER PUBLICATIONS

Borgohain, Rajdeep, et al. "TSET: Token based secure electronic transaction." arXiv preprint arXiv:1203.5960 (2012).*
(Continued)

*Primary Examiner* — Kathleen Palavecino
(74) *Attorney, Agent, or Firm* — K&L Gates LLP

(57) ABSTRACT

Systems, methods, and apparatuses for managing deposits and payments for variable weighted and variable priced agricultural products are disclosed. In an example, an apparatus includes a memory device configured to store a data structure that includes product information of at least one vendor, wherein the product information includes information of variable weighted and variable priced agricultural products, including a product description, at least one price per unit of the variable weighted and variable priced agricultural products, and an estimated range of units for the variable weighted and variable priced agricultural products. The apparatus further includes an interface controller configured to provide interactive interfaces for buyer devices or vendor devices to enable at least one vendor or at least one buyer to display, sell, or buy the variable weighted and variable priced agricultural products, and a processor in communication with the memory device and the interface controller.

20 Claims, 18 Drawing Sheets

(51) Int. Cl.
*G06Q 30/02* (2012.01)
*G06Q 50/02* (2012.01)

(52) U.S. Cl.
CPC ..... *G06Q 30/0623* (2013.01); *G06Q 30/0641* (2013.01); *G06Q 50/02* (2013.01)

(56) References Cited

U.S. PATENT DOCUMENTS

| | | |
|---|---|---|
| 2007/0022024 A1 | 1/2007 | Dowty et al. |
| 2008/0059330 A1 | 3/2008 | Stroman et al. |
| 2009/0287560 A1 | 11/2009 | Sandholm et al. |
| 2013/0173636 A1* | 7/2013 | Branson .............. G06F 16/9537 707/748 |
| 2018/0039961 A1* | 2/2018 | Blouin .................. G06Q 30/06 |

OTHER PUBLICATIONS

Search Report PCT/US2019/061784 dated Jan. 22, 2020—5 pages.
Written Opinion PCT/US2019/061784 dated Jan. 22, 2020—11 pages.
IPRP for related International Patent Application No. PCT/US2019/061784 dated May 18, 2021—7 pages.

* cited by examiner

FIG. 9

SYSTEM AND METHOD TO MANAGE DEPOSITS AND PAYMENTS FOR VARIABLE WEIGHTED AND VARIABLE PRICED AGRICULTURAL PRODUCTS

PRIORITY CLAIM

The present application claims priority to and the benefit of U.S. Provisional Patent Applications No. 62/768,001, filed on Nov. 15, 2018, the entirety of which is incorporated herein by reference.

BACKGROUND

Agricultural products, such as livestock, poultry, aquacultural, viticultural, horticultural, floricultural, silvicultural, or other farm crops, may be difficult to trade because the price of the final product may vary substantively at the time the final product is available for delivery to the buyer depending on the total amount available for harvesting/butchering. Also, the trade of agricultural products typically include a payment of the deposit. Today, the transactions of the trade of the agricultural product are mainly managed manually, which may include a tedious tracking of inventory, deposits, and payments that are manually collated, calculated, and then invoiced for individual products and each buyer.

Although conventional online transaction platforms may provide an option of selling discrete goods/items, the conventional platforms do not account for the variable nature of the agricultural products, which may be offered for sale before they are grown or processed and before the final amount of the products for sale become available. Moreover, conventional online transaction platforms do not allow vendors to charge buyers a deposit (i.e., first charge) before an agricultural product becomes available, and charge the buyers, at a later time, a total amount owed (i.e., second charge), for example, after the agricultural product is harvested, butchered, grown, captured, or processed. Conventional online transaction platforms may generally consider the first charge as a transaction separate from the second charge. Therefore, it is difficult to manage agricultural product transactions using conventional online transaction platforms, and even if the conventional online transaction platforms are used, the transaction of the agricultural product may require a significant amount of manual management, which is error prone, time-consuming, and lengthens the payment cycle.

SUMMARY

The present disclosure provides a system, method, and apparatus for managing deposits and payments for variable weighted and variable priced agricultural products. In an example, an apparatus includes a memory device configured to store a data structure that includes product information of at least one vendor. The product information includes information of variable weighted and variable priced agricultural products. The variable weighted and variable priced agricultural products comprise products offered for sale by a farmer, a fisherman, a rancher, a breeder, or a forager. The product information includes a product description, at least one price per unit of the variable weighted and variable priced agricultural products, and an estimated range of units for the variable weighted and variable priced agricultural products. The apparatus further includes an interface controller configured to provide interactive interfaces for buyer devices or vendor devices to enable at least one vendor or at least one buyer to display, sell, or buy the variable weighted and variable priced agricultural products, and a processor in communication with the memory device and the interface controller.

The processor in cooperation with the interface controller is configured to receive from a buyer device through an application provided by a vendor, a deposit message for a target agricultural product, the deposit message including an identification of the target agricultural product, a deposit amount, an identifier of the buyer, an identification of the vendor, a price per unit, and an estimated range of units for the target agricultural product. The deposit message is received at a first time before the target agricultural product has been harvested, butchered, grown, captured, or processed. The processor is also configured to create and store to the data structure of the memory device a transaction token or record including information from the deposit message, cause the deposit amount to be transferred from an account of the buyer to an account of the vendor, and at a second time after the first time, receive a fulfillment message from a vendor device of the vendor that is indicative that the target agricultural product has been harvested, butchered, grown, captured, or processed, the fulfillment message including a total unit amount.

The processor is further configured to compute a total amount owed by accessing the transaction token or the record, and multiplying the price per unit of the target agricultural product by the total unit amount and subtracting the deposit amount, transmit a transaction completion message to the buyer device that is indicative of the total amount owed, and receive a final payment message from the buyer device for the total amount. Then, the processor is configured to cause the total amount to be transferred from the account of the buyer to the account of the vendor, and cause the total unit amount of the target agricultural product to be provided to the buyer.

Aspects of the subject matter described herein may be useful alone or in combination with one or more other aspect described herein. Without limiting the foregoing description, in a first aspect of the present disclosure, an apparatus includes a memory device configured to store a data structure that includes product information of at least one vendor, where the product information includes information of variable weighted and variable priced agricultural products. The variable weighted and variable priced agricultural products comprise products offered for sale by a farmer, a fisherman, a rancher, a breeder, or a forager, and the product information includes a product description, at least one price per unit of the variable weighted and variable priced agricultural products, and an estimated range of units for the variable weighted and variable priced agricultural products. The apparatus also includes an interface controller configured to provide interactive interfaces for buyer devices or vendor devices to enable at least one vendor or at least one buyer to display, sell, or buy the variable weighted and variable priced agricultural products. The apparatus further comprises a processor in communication with the memory device and the interface controller. The processor in cooperation with the interface controller is configured to receive from a buyer device through an application provided by a vendor, a deposit message for a target agricultural product. The deposit message includes an identification of the target agricultural product, a deposit amount, an identifier of the buyer, an identification of the vendor, a price per unit, and an estimated range of units for the target agricultural product. The deposit message is received at a first time before the target agricultural product has been harvested, butchered, grown, captured, or processed. The processor in cooperation with the interface controller is also configured to create and store to the data structure of the memory device a transaction token or record including information from the deposit message, and cause the deposit amount to be transferred from an account of the buyer to an account of the vendor. The processor in cooperation with the interface controller is further configured to at a second time after the first time, receive a fulfillment message from a vendor device of the vendor that is indicative that the target agricultural product has been harvested, butchered, grown, captured, or processed, the fulfillment message including a total unit amount. The processor in cooperation with the interface controller computes a total amount owed by accessing the transaction token or the record, and multiplying the price per unit of the target agricultural product by the total unit amount and subtracting the deposit amount. The processor in cooperation with the interface controller also transmits a transaction completion message to the buyer device that is indicative of the total amount owed, receives a final payment message from the buyer device for the total amount, causes the total amount to be transferred from the account of the buyer to the account of the vendor, and causes the total unit amount of the target agricultural product to be provided to the buyer.

In accordance with a second aspect of the present disclosure, which may be used in combination with any other aspect listed herein unless stated otherwise, the deposit message includes a desired number of units that is less than the estimated range of units, and the processor is configured to instead determine the total amount owed by multiplying the price per unit of the target agricultural product by the desired number of units and subtracting the deposit amount.

In accordance with a third aspect of the present disclosure, which may be used in combination with any other aspect listed herein unless stated otherwise, the processor causes the desired number of units to be provided to the buyer.

In accordance with a fourth aspect of the present disclosure, which may be used in combination with any other aspect listed herein unless stated otherwise, the estimated range of units for the target agricultural product includes a minimum weight and a maximum weight.

In accordance with a fifth aspect of the present disclosure, which may be used in combination with any other aspect listed herein unless stated otherwise, the deposit message is created in response to receiving an order for the target agricultural product through the application, and the deposit message is generated by creating a first multi-dimensional tuple for the order, wherein the multi-dimensional tuple includes information about the identification of the target agricultural product, the deposit amount, the identifier of the buyer, the identification of the vendor, the price per unit, and the estimated range of units for the target agricultural product.

In accordance with a sixth aspect of the present disclosure, which may be used in combination with any other aspect listed herein unless stated otherwise, in response to receiving the fulfillment message, the processor is configured to create a second multi-dimensional tuple for the order, wherein the second multi-dimensional tuple includes information about the identification of the target agricultural product, the deposit amount, the identifier of the buyer, the identification of the vendor, the price per unit, the estimated range of units, and the total unit amount for the target agricultural product.

In accordance with a seventh aspect of the present disclosure, which may be used in combination with any other aspect listed herein unless stated otherwise, the processor is configured to monitor a market price for the variable weighted and variable priced agricultural products, wherein the market price is a price inputted by a plurality of vendors using the apparatus, for the agricultural products for a predetermined period of time, and provide a recommended range of price per unit for the variable weighted and variable priced agricultural products based on the monitored market price.

In accordance with an eighth aspect of the present disclosure, which may be used in combination with any other aspect listed herein unless stated otherwise, the processor is configured to determine whether a desired number of units received from the buyer device is within the estimated range of units, and in response to determining that the desired number of units is not within the estimated range of units, provide an error message to the buyer device.

In accordance with a ninth aspect of the present disclosure, which may be used in combination with any other aspect listed herein unless stated otherwise, the processor is configured to determine whether an agricultural product inputted by the vendor device is a banned agricultural product, and in response to determining that the agricultural product is the banned item, provide an error message to the vendor device.

In accordance with a tenth aspect of the present disclosure, which may be used in combination with any other aspect listed herein unless stated otherwise, the processor determines whether the agricultural product inputted by the vendor device is the banned agricultural product by comparing the inputted agricultural product with a banned agricultural product list.

In accordance with an eleventh aspect of the present disclosure, which may be used in combination with any other aspect listed herein unless stated otherwise, the banned agricultural product list varies depending on a geographical location of the vendor device or the buyer device.

In accordance with a twelfth aspect of the present disclosure, which may be used in combination with any other aspect listed herein unless stated otherwise, the processor is configured to lock the price per unit of the target agricultural product in response to receiving an order from the buyer device.

In accordance with a thirteenth aspect of the present disclosure, which may be used in combination with any other aspect listed herein unless stated otherwise, the price per unit comprises price per weight, price per crate, or price per pallet.

In accordance with a fourteenth aspect of the present disclosure, which may be used in combination with any other aspect listed herein unless stated otherwise, a method is performed by an apparatus including a memory device configured to store a data structure that includes product information of at least one vendor. The product information includes information of variable weighted and variable priced agricultural products, where the variable weighted and variable priced agricultural products comprise products offered for sale by a farmer, a fisherman, a rancher, a breeder, or a forager, and the product information includes a product description, at least one price per unit of the variable weighted and variable priced agricultural products, and an estimated range of units for the variable weighted and variable priced agricultural products. The method is also performed by the apparatus using an interface controller that is configured to provide interactive interfaces for buyer devices or vendor devices to enable at least one vendor or at least one buyer to display, sell, or buy the variable weighted and variable priced agricultural products. The method is further performed by the apparatus including a processor in communication with the memory device and the interface controller. The method includes receiving from a buyer device through an application provided by a vendor, a deposit message for a target agricultural product, the deposit message including an identification of the target agricultural product, a deposit amount, an identifier of the buyer, an identification of the vendor, a price per unit, and an estimated range of units for the target agricultural product, wherein the deposit message is received at a first time before the target agricultural product has been harvested, butchered, grown, captured, or processed. The method also includes creating and storing to the data structure of the memory device a transaction token or record including information from the deposit message, and causing the deposit amount to be transferred from an account of the buyer to an account of the vendor. The method further includes, at a second time after the first time, receiving a fulfillment message from a vendor device of the vendor that is indicative that the target agricultural product has been harvested, butchered, grown, captured, or processed, the fulfillment message including a total unit amount. Additionally, the method includes computing a total amount owed by accessing the transaction token or the record, and multiplying the price per unit of the target agricultural product by the total unit amount and subtracting the deposit amount. Moreover, the method includes transmitting a transaction completion message to the buyer device that is indicative of the total amount owed, receiving a final payment message from the buyer device for the total amount, causing the total amount to be transferred from the account of the buyer to the account of the vendor, and causing the total unit amount of the target agricultural product to be provided to the buyer.

In accordance with a fifteenth aspect of the present disclosure, which may be used in combination with any other aspect listed herein unless stated otherwise, the deposit message includes a desired number of units that is less than the estimated range of units, and wherein the method further comprises instead determining the total amount owed by multiplying the price per unit of the target agricultural product by the desired number of units and subtracting the deposit amount.

In accordance with a sixteenth aspect of the present disclosure, which may be used in combination with any other aspect listed herein unless stated otherwise, the method further includes causing the desired number of units to be provided to the buyer.

In accordance with a seventeenth aspect of the present disclosure, which may be used in combination with any other aspect listed herein unless stated otherwise, the estimated range of units for the target agricultural product includes a minimum weight and a maximum weight.

In accordance with an eighteenth aspect of the present disclosure, which may be used in combination with any other aspect listed herein unless stated otherwise, the method further includes monitoring a market price for the variable weighted and variable priced agricultural products, wherein the market price is a price inputted by a plurality of vendors using the apparatus, for the agricultural products for a predetermined period of time, and providing a recommended range of price per unit for the variable weighted and variable priced agricultural products based on the monitored market price.

In accordance with a nineteenth aspect of the present disclosure, which may be used in combination with any other aspect listed herein unless stated otherwise, the method further includes locking the price per unit of the target agricultural product in response to receiving an order from the buyer device.

In accordance with a twentieth aspect of the present disclosure, which may be used in combination with any other aspect listed herein unless stated otherwise, the price per unit comprises price per weight, price per crate, or price per pallet.

In a twenty-first aspect of the present disclosure, any of the structure and functionality disclosed in connection with FIGS. 1 to 18 may be combined with any other structure and functionality disclosed in connection with FIGS. 1 to 18.

In light of the present disclosure and the above aspects, it is therefore an advantage of the present disclosure to provide a system that provides a transaction management for an agricultural product in which a final quantity of units to be purchased is variable or unknown at the time of purchase.

The advantages discussed herein may be found in one, or some, and perhaps not all of the embodiments disclosed herein. Additional features and advantages are described herein, and will be apparent from the following Detailed Description and the figures.

BRIEF DESCRIPTION OF THE FIGURES

FIGS. 7 to 10 show diagrams of user interfaces for buyers for making an order for listed agricultural products, according to an example embodiment of the present disclosure.

DETAILED DESCRIPTION

Figure 1:
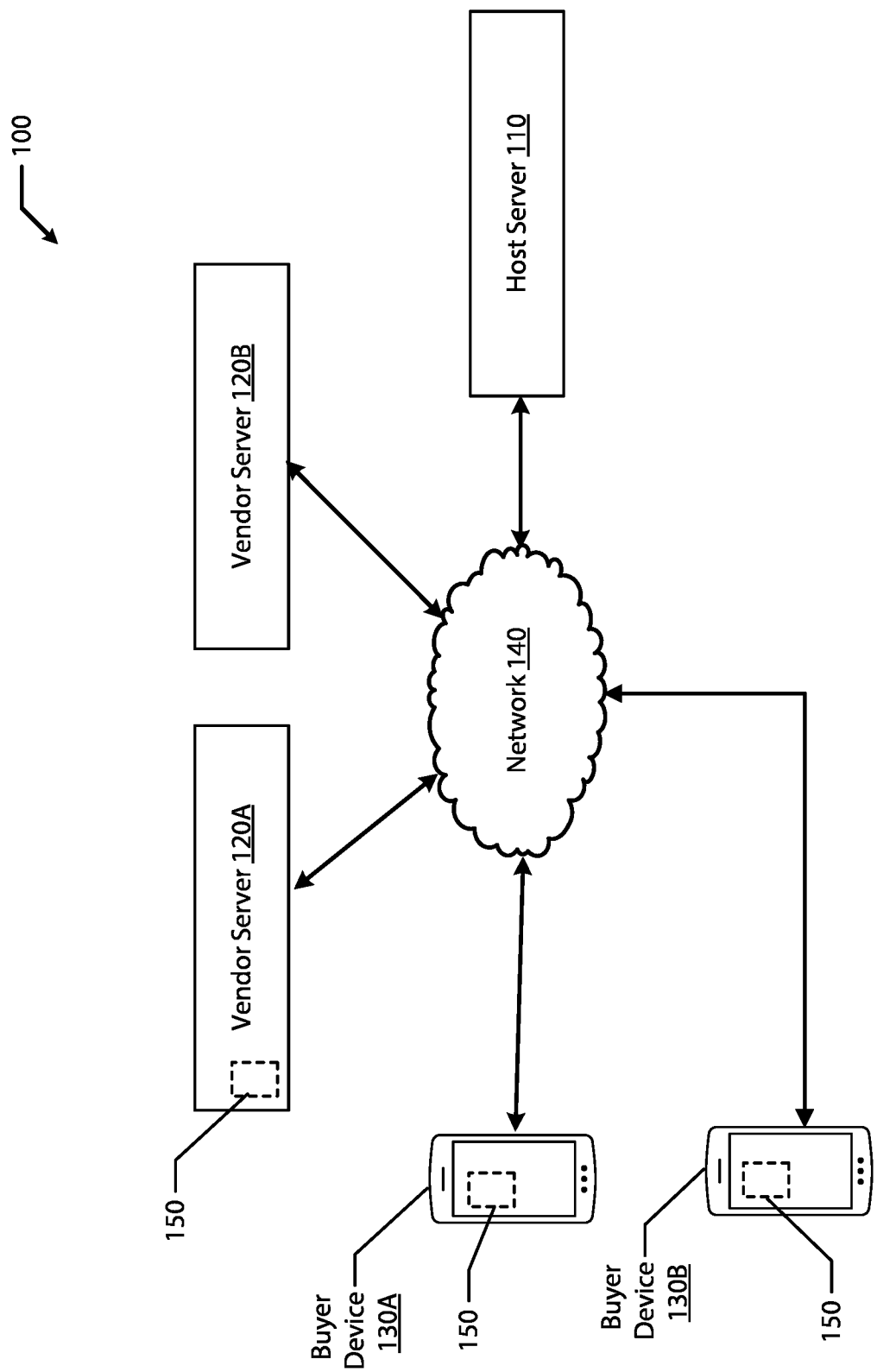
FIG. 1 shows an example system including a host server that enables vendors to sell agricultural products to buyers, according to an example embodiment of the present disclosure.

The present disclosure relates in general to a method, system, and apparatus configured to provide automated management of deposits and payments for variable weighted and variable priced agricultural products.

As used herein, variable weighted and variable priced agricultural products or agricultural products may refer to livestock, poultry, aquacultural, viticultural, horticultural, floricultural, silvicultural, other farm crops, or any other products offered for sale by a farmer, a fisherman, a rancher, a breeder, or a forager. In an example, a vendor may offer a steer for sale before the steer has grown or before the steer has been born. The vendor offers the steer for sale beforehand by providing a price per pound or price per hundredweight and an estimated weight range for the steer. The estimated weight range may correspond to an estimated weight of the steer at a certain number of months from birth when a steer is traditionally butchered. As such, the buyer does not know the final price, only an expected price based on the price per pound or hundredweight, which is locked or set after a deposit is provided. After the steer has been butchered or is ready for sale, the vendor provides the final weight. The total price for the steer may then be calculated and conveyed to the buyer based on locked price per pound or hundredweight. In some examples, the final agricultural product or the price/final price for the final agricultural product may be for a live animal. For example, a breeder or a forager may sell the live animal grown or captured without butchering the animal (e.g., based on weight).

As used herein, a vendor may refer to any person that offers to sell or sells the agricultural products. As used herein, a buyer may refer to any person that offers to buy or purchases the agricultural products. As used herein, a host server may refers to a server that is managed by a host (e.g., service provider, host server manager, application/website manager) to provide/upgrade/manage the functions performed by the components of the system 100 described herein.

As discussed above, it is difficult to manage the transaction of the agricultural products using the conventional method/apparatus/system because the conventional method/apparatus/system may be typically designed for finalized/completed discrete goods or items with a set/fixed amount, and may not typically consider the variable nature of the agricultural products. Aspects of the present disclosure may address the deficiencies in the convention method/apparatus/system.

For example, in the present disclosure, an apparatus may include a memory device configured to store a data structure that includes product information of at least one vendor. The product information may include information about variable weighted and variable priced agricultural products, including a product description, a price per unit of the variable weighted and variable priced agricultural products, and an estimated range of units for the variable weighted and variable priced agricultural products. The apparatus may further include an interface controller configured to provide interactive interfaces for buyer devices or vendor devices to enable at least one vendor or at least one buyer to display, sell, or buy the variable weighted and variable priced agricultural products, and a processor in communication with the memory device and the interface controller.

The processor in cooperation with the interface controller may be configured to receive from a buyer device through an application provided by a vendor, a deposit message for a target agricultural product. The deposit message may include an identification of the target agricultural product, a deposit amount, an identifier of the buyer, an identification of the vendor, a price per unit, and an estimated range of units for the target agricultural product. The deposit message may be received at a first time before the target agricultural product has been harvested, butchered, grown, captured, or processed. The processor may be also configured to create and store to the data structure of the memory device a transaction token or a transaction record including information from the deposit message, and at a second time after the first time, receive a fulfillment message from a vendor device of the vendor that is indicative that the target agricultural product has been harvested, butchered, grown, captured, or processed. The fulfillment message may include a final total unit amount that is available for sale.

The processor may be further configured to compute a total amount owed by accessing the transaction token or the transaction record, and multiplying the price per unit of the target agricultural product by the final total unit amount and subtracting the deposit amount, and transmit a transaction completion message to the buyer device that is indicative of the total amount owed by the buyer.

In this way, aspects of the present disclosure may advantageously enable the system to track the order from the beginning (e.g., placement of the order with a payment of the deposit) until the end (e.g., charging the total amount owed, which subtracts the deposit from the final charging amount), thereby improving the efficiency in the management of the deposits and payments for the agricultural products, for example, by allowing the vendors to handle multiple transactions (first charge for the deposit amount and second charge for the final amount owed) as a single order. Also, aspects of the present disclosure allow vendors to offer to sell agricultural products on an online platform before the agricultural products are grown or processed, and/or before the final available unit amount becomes available by consolidating and simplifying the process, thereby solving the complex inventory problems of selling agricultural products, and saving time and efforts to manage the transactions of the agricultural products.

FIG. 1 shows an example system 100 that enables vendors to sell agricultural products to buyers, according to an example embodiment of the present disclosure. The system 100 may include a host server 110 that is configured to host one or more systems, algorithms, applications, websites, interactive interfaces, application programming interfaces ("APIs"), etc. that provide for the management of deposits and payments for variable weighted and variable priced agricultural products. The system 100 may also include one or more vendor servers 120A/B that are configured for the management of the agricultural products. The system 100 may further include one or more buyer devices 130A/B (e.g., user devices). While FIG. 1 shows two vendor devices 120A/B and two buyer devices 130A/B, the example host server 110 may be configured to operate or provide services for more vendor/buyer devices.

The one or more vendor devices 120A/B may include any vendor's agricultural product management system. The one or more vendor devices 120A/B may include at least one memory device that stores instructions and at least one processor configured to execute the instructions. Execution of the instructions by the processor of the one or more vendor devices 120A/B enables the one or more vendor devices 120A/B to perform the operators described herein. The one or more vendor servers 120A/B may connect to the host server 110 via a network 140 (e.g., the Internet and/or a cellular network). The one or more vendor servers 120A/B may receive/store/provide product information related to the variable weighted and variable priced agricultural products. The product information may include a product description, at least one price per unit, and an estimated range of units for the variable weighted and variable priced agricultural products.

The one or more vendor servers 120A/B may be any processor, computer, workstation, laptop computer, smartphone, tablet computer, etc. In some examples, the one or more vendor servers 120A/B are communicatively coupled to a local venue where the agricultural products are produced by farmers, fishermen, or ranchers. The local venue may also include a monitoring system (e.g., servers, sensors, and/or video cameras) that is configured to monitor the status of the agricultural products, and send the status information to the one or more vendor servers 120A/B. The monitoring system may send a notification to the one or more vendor servers 120A/B if the agricultural products are harvested, butchered, grown, captured, or processed, or the agricultural products are scheduled to be harvested, butchered, grown, captured, or processed soon (within a predetermined time).

The one or more buyer devices 130A/B may be any type of device including a processor, a smartphone, a cellular phone, a tablet computer, a laptop computer, a workstation, smart-eyewear, smartwatch, smart speaker, etc. The one or more buyer devices 130A/B may include at least one memory device that stores instructions and at least one processor configured to execute the instructions. Execution of the instructions by the processor of the one or more buyer devices 130A/B enables the one or more buyer devices 130A/B to perform the operators described herein.

The one or more buyer devices 130A/B may include an application 150 (e.g., an App) that is specified by at least some of the instructions that are stored in the memory device. The application 150 may operate in connection with the host server 110 and may be configured to display a user interface that provides product information provided by the host server 110 and/or the one or more vendor servers 120A/B. Users (e.g., buyers) of the one or more buyer devices 130A/B may use the application 150 to purchase the agricultural products. The application 150 may connect to one or more APIs at the host server 110 to provide query requests for the agricultural products and return query results. The APIs at the host server 110 may also be configured to enable the application 150 to submit a list of agricultural products and/or enable a purchase of agricultural products selected by the buyers.

In some embodiments, instead of the application 150, a web browser may be used to provide services/functions provided by the application 150. The web browser may be configured to access a website hosted or otherwise provided by the host server 110. In some examples, buyers may use the buyer devices 130A/B to access a website of the host server 110. The web browser on the buyer devices 130A/B may be used to access the website for purchasing/managing the agricultural products.

In some examples, vendors may use the application 150 to add/upload a list of agricultural products for sale, for example, through the vendor devices 120A/B. The vendors may use the application 150 to provide product information about the listed agricultural products.

Figure 2:
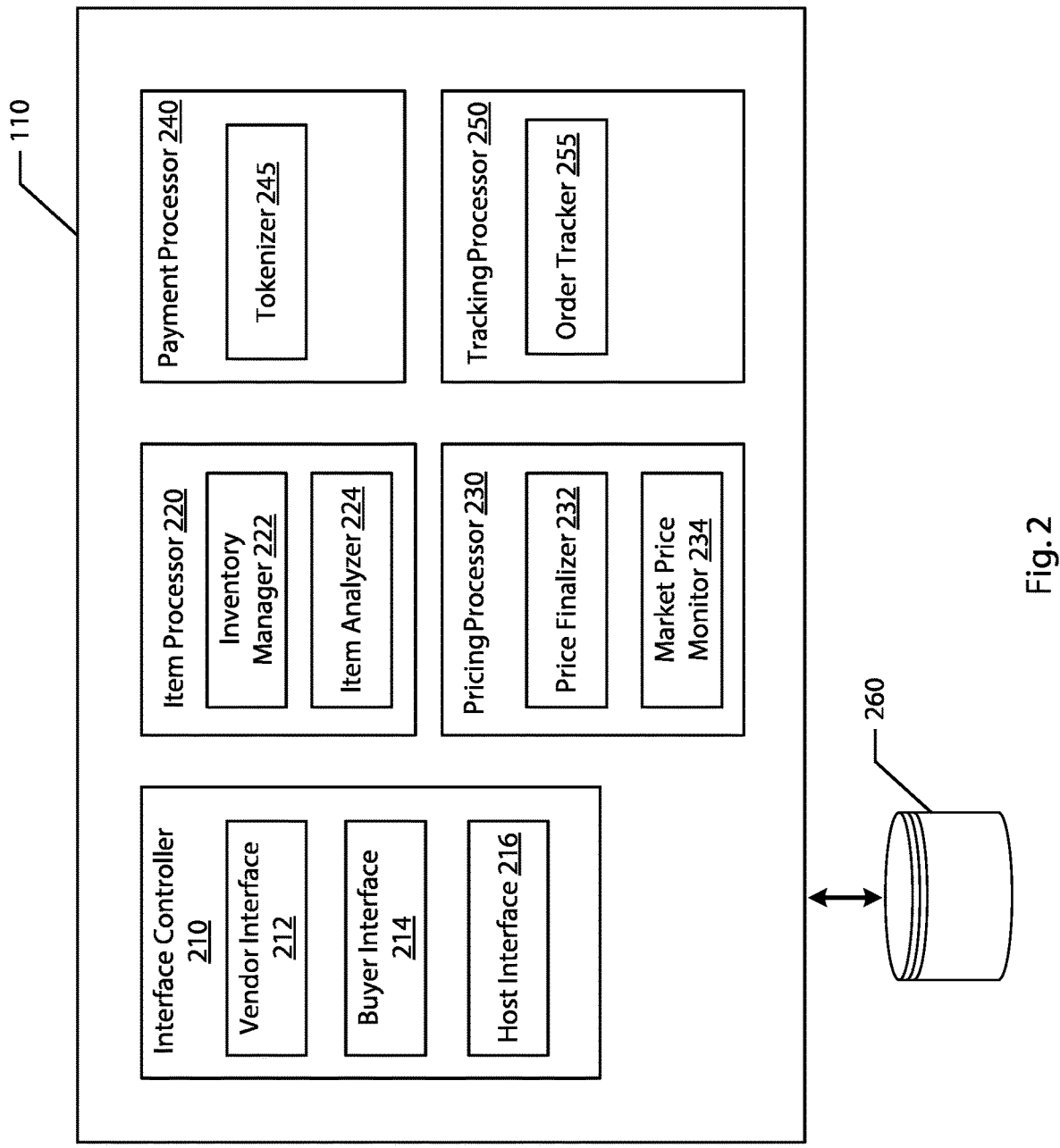
FIG. 2 shows a diagram of the host server of FIG. 1, according to an example embodiment of the present disclosure.

FIG. 2 shows a diagram of the host server 110 of FIG. 1, according to an example embodiment of the present disclosure. FIG. 2 illustrates operational components of the host server 110 including an interface controller 210, an item processor 220, pricing processor 230, payment processor 240, and tracking processor 250. As illustrated in FIG. 2, the host server 110 may be in communication with a memory device 260. In an example, the memory device 260 may be part of the host server 110. In another example, the memory device 260 may be separate from the host server 110. The components 210 to 250 (and 260 if the memory device 260 is part of the host server 110) are representative of hardware and/or software of the host server 110. For instance, one or more instructions may be stored to a memory device (e.g., memory device 260 or any other memory devices) that define operation of the components 210 to 250. Execution of the instructions by a processor of the host server 110 may cause the processor to perform the operations described herein. The instructions may be part of one or more software programs or applications. In some embodiments, at least some of the instructions may be implemented by hardware components, such as an Application Specific Integrated Circuit ("ASIC").

As used herein, a memory device (e.g., memory device 260) may refer to a volatile or non-volatile memory device, such as RAM, ROM, EEPROM, a distributed storage system (e.g., distributed ledgers/blockchain), or any other device capable of storing data. As used herein, a processor may refer to a device capable of executing instructions encoding arithmetic, logical, and/or I/O operations. In one illustrative example, a processor may follow Von Neumann architectural model and may include an arithmetic logic unit ("ALU"), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit ("CPU"). Processors may be interconnected using a variety of techniques, ranging from a point-to-point processor interconnect, to a system area network, such as an Ethernet-based network. In an example, the one or more processors may be in the host server 110. In an example, all of the disclosed methods and procedures described herein can be implemented by the one or more processors. Further, the host server 110 may be distributed over multiple processors, memories, and networks.

The example interface controller 210 of FIG. 2 may be configured to provide interactive interfaces for one or more buyer devices 130A/B or one or more vendor devices 120A/B to enable one or more vendors or one or more buyers to display, sell, or buy the variable weighted and variable priced agricultural products. The interface controller 210 may include a vendor interface 212, a buyer interface 214, and a host interface 216.

The example vendor interface 212 may include one or more APIs for receiving search queries and transmitting data for display in the application 150 or on a website via a web browser. The vendor interface 212 may be configured to enable vendors, via the servers 120A/B, to add/upload agricultural products for sale. The vendor interface 212 may be also configured to enable vendors to provide product information of the added/uploaded agricultural products. In some examples, the product information provided by the vendors through the vendor interface may include a product description, a price per unit, and an estimated range of units for the added/uploaded variable weighted and variable priced agricultural products. In some examples, the product information may further include a deposit amount for each of the added/uploaded agricultural products.

The example buyer interface 214 may include one or more APIs for receiving search queries and transmitting data for display in the application 150 or on a website via a web browser. The buyer interface 214 may be configured to provide for the display of agricultural products, or the product information related to the added/uploaded agricultural products. The buyer interface 214 may be also configured to receive a purchase order from the application 150 or web browser of the buyer devices 130A/B. The buyer interface 214 may be configured to require the buyer (device) to pay the deposit amount for the ordered agricultural products when making the purchase order.

The example host interface 216 may include one or more APIs for receiving search queries and transmitting data for display in the application 150 or on a website via a web browser. The host interface 216 may be configured to enable a host (e.g., service provider, host server manager, application/website manager), via the host server 110, to manage the system 100 (e.g., provide/upgrade/manage the functions performed by the components of the system 100 described herein).

The item processor 220 may include an inventory manager 222 and an item analyzer 214. The inventory manager 222 may be configured to manage the inventory of the agricultural products added/uploaded by the one or more vendors. The inventory manager 222 may be also configured to manage the product information of the added/uploaded agricultural products. For example, when receiving a request to add/upload agricultural products and related product information from a vendor device 120A/B via a vendor interface, the inventory manager 222 may add/upload the agricultural products to the system (e.g., host server 110, application 150, website), and store the product information in the memory device 260.

The item analyzer 224 may be configured to determine whether an agricultural product added/uploaded by a vendor device 120A/B is a banned agricultural product. If it is determined that the added/uploaded agricultural product is a banned agricultural product, the item analyzer 224 may provide an error message to the host server 110 and/or the vendor device 120A/B. In some examples, the item analyzer 224 may be configured to determine whether an agricultural product, for which a purchase order is made by a buyer device 130A/B, is a banned agricultural product. If it is determined that the ordered agricultural product is a banned agricultural product, the item analyzer 224 may provide an error message to the host server 110 and/or the buyer device 130A/B.

The item analyzer 224 may determine whether the agricultural product added/uploaded by the vendor device 120A/B or for which a purchase order is made by the buyer device 130A/B is a banned agricultural product by comparing the agricultural product with a banned agricultural product list. The banned agricultural product list may include a list of agricultural products banned for a transaction. An example of banned agricultural products may include, but not limited to, narcotics (marijuana, cocaine, heroin), endangered animals, an agricultural product (e.g., state-inspected processed meats) that is not permitted to be sold in a certain location (e.g., out of the state the agricultural product is permitted), and any other illegal products (e.g., explosives).

The banned agricultural product list may vary depending on a geographical location of the vendor (device) or the buyer (device). For example, marijuana may be in the banned agricultural product list for a vendor (device) or the buyer (device) located in a state or country where marijuana is illegal, but the banned agricultural product list may not include marijuana for a vendor (device) or a buyer (device) located in a state or country where marijuana is legalized. The item analyzer 224 may determine the location of the vendor (device) or the buyer (device), compare marijuana with a banned agricultural product list for the location of the vendor or the buyer, and if it is determined that marijuana is included in the banned agricultural product list for the location of the vendor (device) or the buyer (device), the item analyzer 224 may provide an error message. For agricultural products that are allowed only in certain locations (e.g., state-inspected processed meats, which can be sold only in the state where the inspection is performed), the item analyzer may allow the agricultural products to be sold for pick-up or delivery only within the allowed locations (e.g., the state where the inspection is performed).

The tracking processor 250 may include an order tracker 255. The order tracker 255 may be configured to track each of the purchase orders made by one or more buyers for a target agricultural product. When a buyer makes a purchase order using the buyer device 130A/B via the buyer interface 214 (and pays the deposit amount), the order tracker 255 may generate/receive a deposit message for a target agricultural product. In some examples, the order tracker 255 may generate the deposit message through the application 150 or website. In other examples, the order tracker 255 may receive the deposit message generated by the application 150, website, or buyer/vendor device. The deposit message may include an identification of the target agricultural product, a deposit amount for the target agricultural product, an identifier of the buyer, an identification of the vendor, a price per unit for the target agricultural product, and an estimated range of units for the target agricultural product. The estimated range of units for the target agricultural product may include a minimum weight and a maximum weight. In some examples, the identification of the target agricultural product may include an identification of each purchase order. In some examples, the deposit message may be generated/received at a time before the target agricultural product has been harvested, butchered, grown, or captured. In other examples, the deposit message may be generated/received at a time after the target agricultural product has been harvested, butchered, grown, or captured (but before they are fully processed for sale). The order tracker 255 may store the deposit message in a memory device (e.g., memory device 260).

In some examples, the order tracker 255 may be configured to lock the price per unit of the target agricultural product in response to receiving the purchase order from the buyer device 130A/B. In some examples, the price per unit may comprise price per weight, price per crate, price per pallet, or price per any other suitable unit.

In some examples, the order tracker 255 may be configured to generate/receive a fulfillment message for a target agricultural product. For example, when a vendor determines the final total unit amount, the vendor may input the final total unit amount through the vendor interface 212, and this may cause the order tracker 255 to generate or receive the fulfillment message for the target agricultural product. The fulfillment message may include the final total unit amount available for the target agricultural product. The fulfillment message may be indicative that the target agricultural product has been harvested, butchered, grown, captured, or processed, or the target agricultural product would be harvested, butchered, grown, captured, or processed soon (within a predetermined time). In some examples, the order tracker 255 may generate the fulfillment message through the application 150 or website. In other examples, the order tracker 255 may receive the fulfillment message generated by the application 150, website, or vendor device 120A/B. In some examples, the fulfillment message may further include an identification of the target agricultural product, a deposit amount for the target agricultural product, an identifier of the buyer, an identification of the vendor, and/or a price per unit for the target agricultural product. The order tracker 255 may store the fulfillment message in a memory device (e.g., memory device 260).

In some examples, the fulfillment message may be generated using the deposit message. For example, when receiving the final total unit amount from the vendor device 120A/B, the order tracker may identify the identification of the target agricultural product (e.g., identification of the purchase order for the target agricultural product), load, from the memory device, the deposit message for the target agricultural product using the identified identification of the target agricultural product, and generate the fulfillment message. In other examples, the fulfillment message may only include the final total unit amount information, and the order tracker 255 may generate a separate order tracking message, for example, using the deposit message, as described above. The fulfillment message or the order tracking message may include information about an identification of the target agricultural product, a deposit amount for the target agricultural product, an identifier of the buyer, an identification of the vendor, an estimated range of units for the target agricultural product, a price per unit for the target agricultural product, and/or the total unit amount. The deposit message, fulfillment message, and/or the order tracking message may be used to finalize the purchase order for the target agricultural product, as described in more detail below. In some examples, the order tracking message may comprise the deposit message, fulfillment message, or any other message that is used to track and/or finalize the purchase order for the target agricultural product.

In some examples, the deposit message, fulfillment message, and/or the order tracking message may be created by creating a table for the purchase order for the target agricultural product. This table may be stored in a data structure in a memory device. In other examples, the deposit message, fulfillment message, and/or the order tracking message may be created by creating a multi-dimensional tuple for the purchase order. For example, the deposit message may be generated by creating a multi-dimensional tuple. The multi-dimensional tuple for the deposit message may be associated with the above-discussed information included in the deposit message. For example, a deposit message tuple may be a tuple of {identification of the target agricultural product, deposit amount, identifier of the buyer, identification of the vendor, price per unit, estimated range of units}. In response to receiving an order for the target agricultural product, the deposit message may be generated by creating the multi-dimensional tuple.

Similarly, the fulfillment message or the order tracking message may be generated by creating a multi-dimensional tuple. The multi-dimensional tuple for the fulfillment message or the order tracking message may be associated with the above-discussed information included in the fulfillment message or the order tracking message. For example, a fulfillment message/order tracking message tuple may be a tuple of {identification of the target agricultural product, deposit amount, identifier of the buyer, identification of the vendor, price per unit, total unit amount}.

The payment processor 240 may be configured to process the payment made by a buyer or a buyer device 130A/B. The payment processor 240 may include a tokenizer 245. The tokenizer 245 may be configured to tokenize any (digital) payment made by the buyer or buyer device 130A/B. For example, when a purchase order is made, a deposit amount is paid and a deposit message is generated/received, the tokenizer 245 (for example, in cooperation with the order tracker 255) may create and store to the memory device 260 (e.g., a data structure therein) a transaction token or record including information from the deposit message. The transaction token may correspond to the deposit amount paid for the target agricultural product. The payment processor 240 may be configured to cause the deposit amount to be transferred from an account of the buyer to an account of the vendor, for example, by tracking the purchase order using the deposit message.

The pricing processor 230 may include a price finalizer 232 and a market price monitor 234. The price finalizer 232 may be configured to finalize the purchase order for the target agricultural product. For example, the price finalizer 232 may be configured to compute a total amount owed by the buyer. In some examples, the price finalizer 232 may compute the total amount owed by accessing the transaction token or transaction record, and multiplying the price per unit of the target agricultural product by the total unit amount and subtracting the deposit amount. As used herein, the transaction record may refer to any record (e.g., deposit message, final message, order tracking message) related to the purchase order for the target agricultural product.

In other examples, the price finalizer 232 may compute the total amount owed by subtracting the deposit amount from a final total price. The final total price may be computed by multiplying the price per unit of the target agricultural product by the total unit amount, or inputted from the vendor device 120A/B.

Once the total amount owed by the buyer is computed, the payment processor 240 may transmit a transaction completion message to the buyer device. The transaction completion message may be indicative of the total amount owed. The payment processor 240 may receive a final payment message from the buyer device for the total amount. Then, the payment processor 240 may cause the total amount to be transferred from an account of the buyer to an account of the vendor. Then, the inventory manager 222 may cause the total unit amount of the target agricultural product to be provided to the buyer. For example, the inventory manager 222 may create a delivery message to the vendor device 120A/B. The delivery message may include information about the shipping deadline, buyer name, and/or destination address. Once the target agricultural product is delivered, the inventory manager 222 may record the order status of the target agricultural product as fulfilled in the memory device 260.

In some examples, the deposit message may include a desired number of units that is less or greater than the estimated range of units. The desired number of units may refer to the number of units for the target agricultural product that a buyer indicated (by inputting a desired value through the buyer device 130A/B) that the buyer wants to purchase. The tracking processor 250 may be configured to determine whether the desired number of units is less or greater than the estimated range of units. If it is less or greater than the estimated range of units, the pricing finalizer 232 may be configured to instead determine/compute the total amount owed by multiplying the price per unit of the target agricultural product by the desired number of units and subtracting the deposit amount. Then, the inventory manager 222 may cause the desired number of units to be provided to the buyer.

In other examples, the tracking processor 250 may be configured to determine whether the desired number of units received from the buyer device is within the estimated range of units, and in response to determining that the desired number of units is not within the estimated range of units, the tracking processor may be configured to provide an error message to the buyer device 130A/B.

The market price monitor 234 of the pricing processor 230 may be configured to monitor a market price for the agricultural products. For example, the market price may be a price inputted by a plurality of vendors using the application 150/website provided by the host server 110. The market price information for the agricultural products may be analyzed for a predetermined period of time (3 days, 1 week, 1 month, 3 months, 1 year, etc.). Based on the analyzed market price information, the market price monitor 234 may provide a recommended range of price per unit for the variable weighted and variable priced agricultural products. This recommended range of price per unit may be provided to the vendor device 120A/B when the vendors are adding/uploading the agricultural products to provide a guidance to the vendors for the general market trend for the price per unit of the agricultural products. The recommended range of price per unit may be in the form of maximum/minimum price per unit, average price per unit, or median price per unit, or in any other suitable form.

Figure 3:
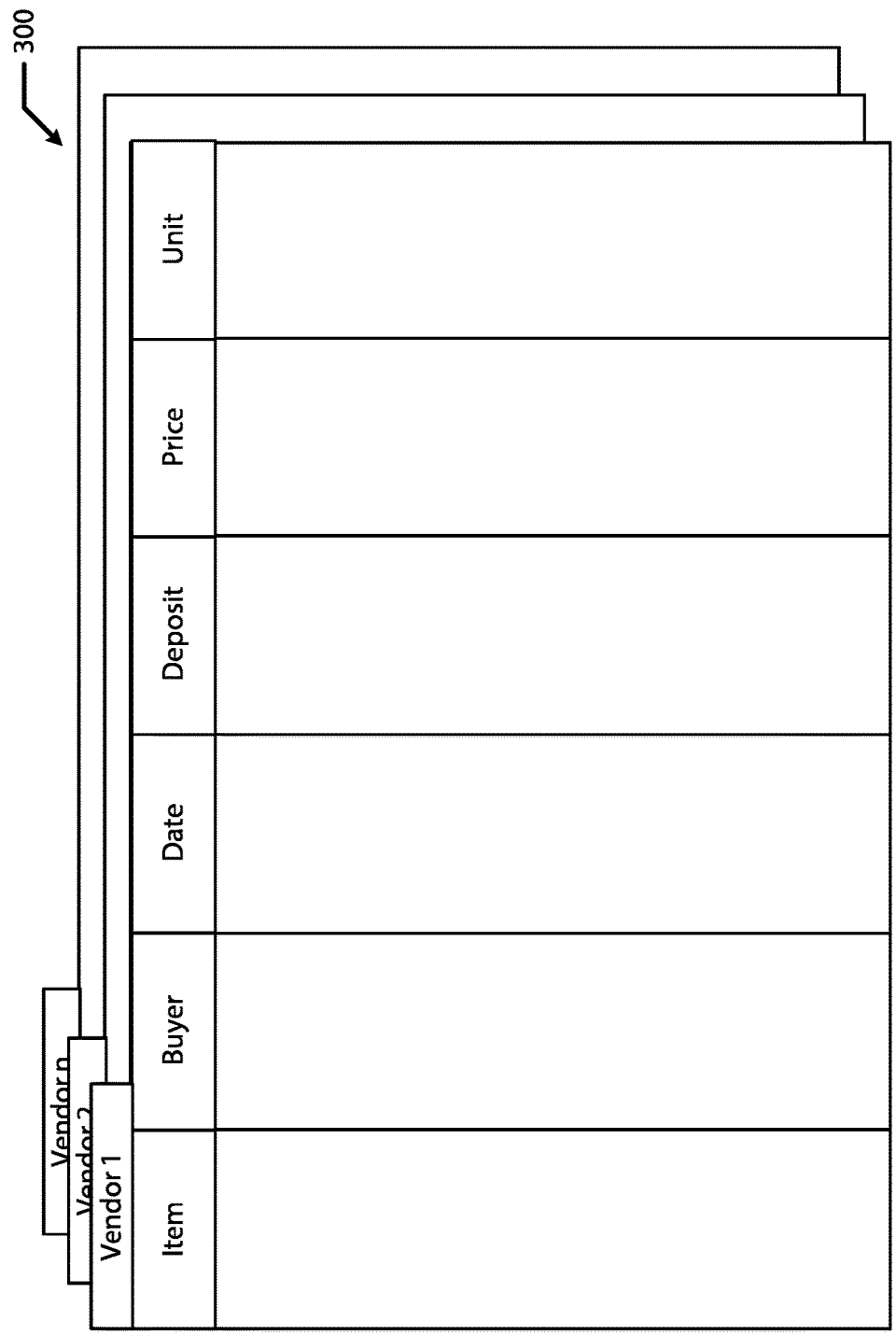
FIG. 3 shows a diagram of an example data structure of a memory device of the host server, according to an example embodiment of the present disclosure.

The memory device 260 may include a database or other data structure that stores the product information provided by the vendor device 120A/B, or any other information related to the agricultural products, purchase orders (date, time, etc.), vendors, and/or buyers. As described above, the product information may include a product description, price per unit of the variable weighted and variable priced agricultural products, and an estimated range of units for the variable weighted and variable priced agricultural products. In an example, the data structure of the memory device 260 may include a table that shows the transactions in the system. FIG. 3 shows a diagram of an example data structure of the memory device 260. As shown in FIG. 3, the table may include information about the item (agricultural products), buyers, vendors, transaction date, deposit amount, prices, and/or units. The table may include any additional information related to the agricultural products and purchase orders (e.g., price per unit, final total unit amount, final total price, total amount owed, monitored market price, recommend price per unit, estimated harvesting/butchering date, location of the vendor device/buyer device, etc.). In some examples, the table may be managed for each vendor (e.g., a first table for vendor 1, a second table for vendor 2, . . . , and an nth table for vendor n) as shown in FIG. 3. In other examples, the table may be managed in any other suitable form.

Figure 4:
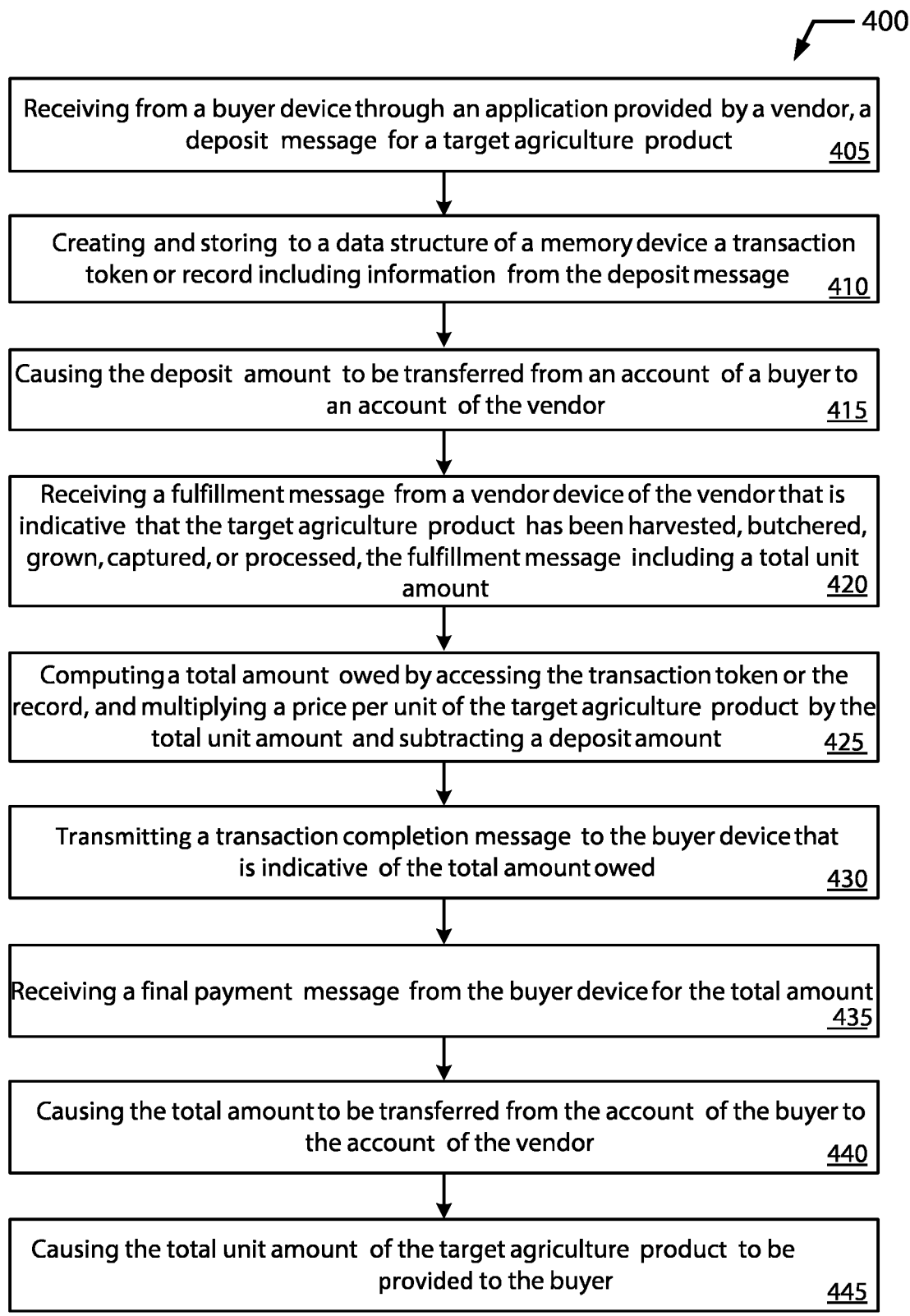
FIG. 4 is a flowchart illustrating an example process for managing deposits and payments for variable weighted and variable priced agricultural products.

FIG. 4 shows a diagram of an example procedure 400 for managing deposits and payments for variable weighted and variable priced agricultural products, according to an example embodiment of the present disclosure. Although the procedure 400 is described with reference to the flow diagram illustrated in FIG. 4, it should be appreciated that many other methods of performing the steps associated with the procedure 400 may be used. For example, the order of many of the blocks may be changed, certain blocks may be combined with other blocks, and many of the blocks described are optional. Further, the actions or steps described in procedure 400 may be performed among multiple devices including, for example the host server 110, the one or more vendor servers 120A/B, the one or more buyer devices 130A/B, and/or the application 150 of FIGS. 1 and 2. As used herein, a processor may refer to the item processor 220, pricing processor 230, payment processor 240, tracking processor 250, or any other processors in the host server 110 or in the system 100. It should be appreciated that a separate instance of the procedure 400 may be executed for each transaction between a vendor and a buyer.

In an example, a processor may receive from a buyer device through an application provided by a vendor, a deposit message for a target agricultural product (block 405). For example, the tracking processor 250 may receive from a buyer device 130A/B through an application 150 provided by a vendor, a deposit message for a target agricultural product. The deposit message may include an identification of the target agricultural product, a deposit amount, an identification of the buyer, an identification of the vendor, a price per unit, and/or an estimated range of units for the target agricultural product. The deposit message may be received at a time before the target agricultural product has been harvested, butchered, grown, captured, or processed.

The processor may then create and store to the data structure of the memory device a transaction token or record including information from the deposit message (block 410). For example, the payment processor 240 and/or the tracking processor 250 may create and store to the data structure of the memory device 260 a transaction token or a transaction record including information from the deposit message. The processor may also cause the deposit amount to be transferred from an account of the buyer to an account of the vendor (block 415). For example, the payment processor 240 may cause the deposit amount to be transferred from an account of the buyer to an account of the vendor. This may include sending one or more transaction messages to banks that host the accounts to provide for the transfer of the amount.

At a later time, the processor may receive a fulfillment message from a vendor device of the vendor that is indicative that the target agricultural product has been harvested, butchered, grown, captured, or processed, the fulfillment message including a total unit amount (block 420). For example, the tracking processor 250 may receive a fulfillment message from a vendor device 120A/B of the vendor that is indicative that the target agricultural product has been harvested, butchered, grown, captured, or processed in response to receiving, from the vendor, a final total unit amount available for the target agricultural product. The processor may then compute a total amount owed by accessing the transaction token or the record, and multiplying the price per unit of the target agricultural product by the total unit amount and subtracting the deposit amount (block 425).

For example, the pricing processor 230 may compute a total amount owed by accessing the transaction token or the transaction record, and multiplying the price per unit of the target agricultural product by the total unit amount and subtracting the deposit amount. In some examples, the total amount owed may be further computed/adjusted in consideration of other fees (e.g., shipping fees, preparation fees, processing fees, service fees, taxes, other credits, etc.).

The processor next transmits a transaction completion message to the buyer device that is indicative of the total amount owed (block 430). For example, the payment processor 240 may transmit a transaction completion message to the buyer device 130A/B that is indicative of the total amount owed by the buyers. The processor may receive a final payment message from the buyer device for the total amount (block 435). For example, the payment processor 240 may receive a final payment message from the buyer device 130A/B for the total amount. Then, the processor may cause the total amount to be transferred from the account of the buyer to the account of the vendor (block 440). For example, the payment processor 240 may cause the total amount to be transferred from the account of the buyer to the account of the vendor. Then, the processor may cause the total unit amount of the target agricultural product to be provided to the buyer (block 445). For example, the item processor 220 may cause the total unit amount of the target agricultural product to be provided to the buyer. This may include transmitting one or more messages that cause the purchased agricultural product to be packaged and shipped to the address specified by the buyer. The example procedure 400 then ends for this transaction.

Figure 5:
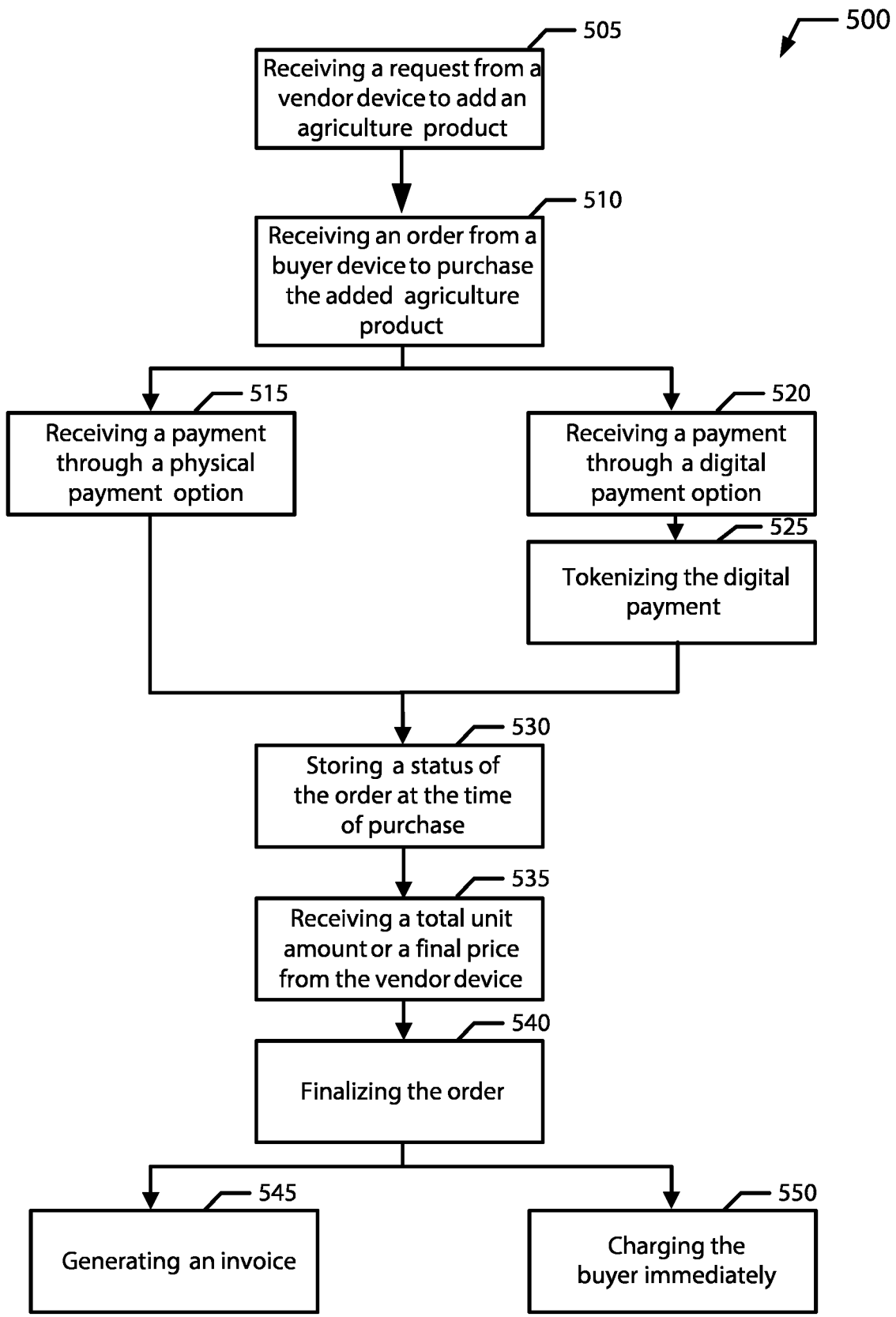
FIG. 5 is a flow diagram illustrating an example process for managing deposits and payments for variable weighted and variable priced agricultural products.

FIG. 5 shows a diagram of an example procedure 500 for managing deposits and payments for variable weighted and variable priced agricultural products, according to an example embodiment of the present disclosure. Although the procedure 500 is described with reference to the flow diagram illustrated in FIG. 5, it should be appreciated that many other methods of performing the steps associated with the procedure 500 may be used. For example, the order of many of the blocks may be changed, certain blocks may be combined with other blocks, and many of the blocks described are optional. Further, the actions or steps described in procedure 500 may be performed among multiple devices including, for example the host server 110, the one or more vendor servers 120A/B, the one or more buyer devices 130A/B, and/or the application 150 of FIGS. 1 and 2. As used herein, a processor may refer to the item processor 220, pricing processor 230, payment processor 240, tracking processor 250, or any other processors in the host server 110 or in the system 100. It should be appreciated that a separate instance of the procedure 500 may be executed for each transaction between a vendor and a buyer.

Figure 6:
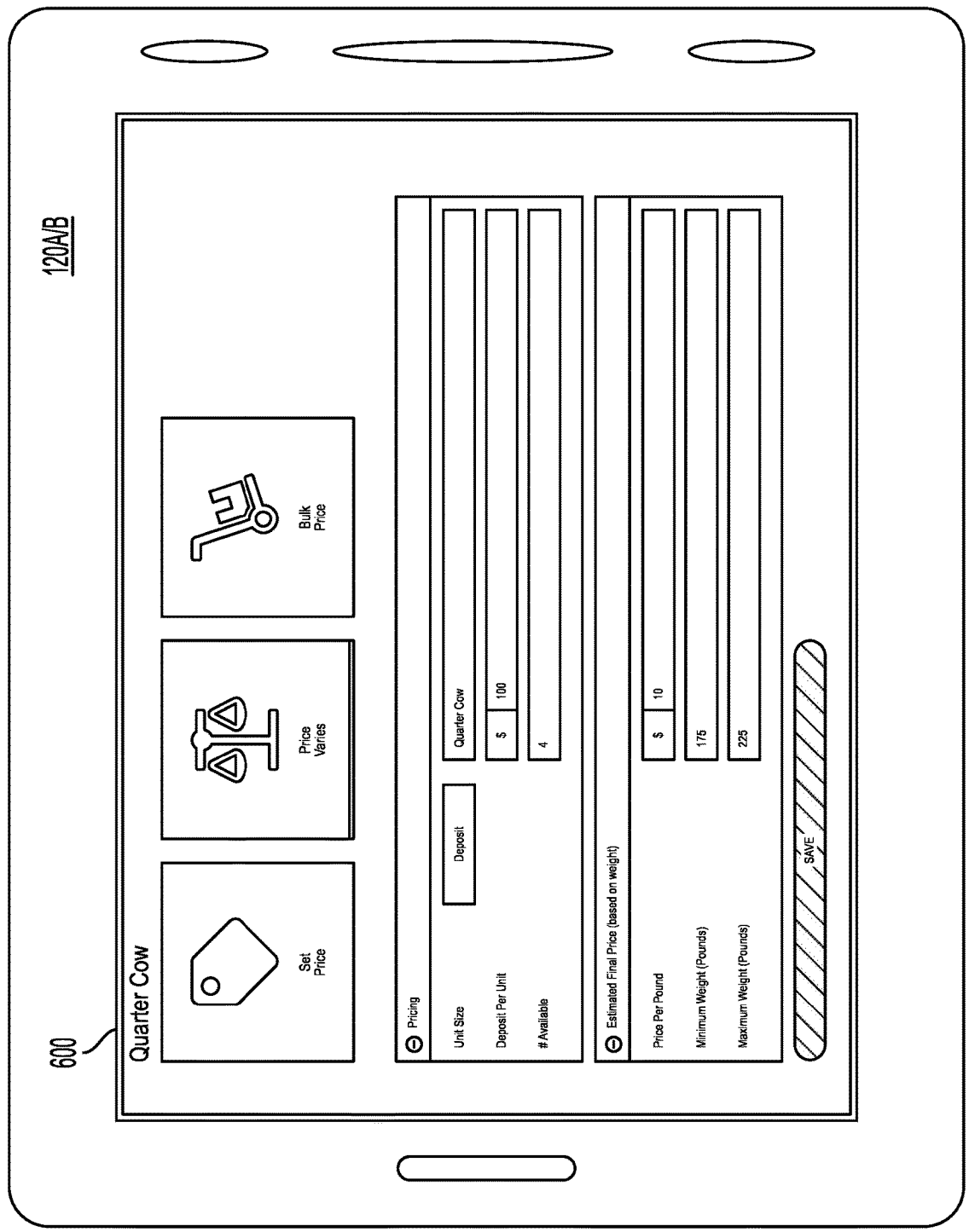
FIG. 6 shows a diagram of a user interface for vendors that enables vendors to provide product information for agricultural products, according to an example embodiment of the present disclosure.

In an example, a processor may receive a request from a vendor device to add an agricultural product (block 505). When receiving such request, a user interface 600 (shown in FIG. 6) for the vendors (provided by the vendor interface 212 of FIG. 2) may prompt the vendors to input values related to a unit size, a deposit amount (per unit), available number of units, a price per unit, and/or a minimum/maximum unit. The user interface 600 for the vendors may also provide different pricing options (e.g., set price, variable price, and bulk price). Then, the inputted agricultural product and product information may be added/upload to the system so that it is visible to the buyers, for example, through the application 150/website.

Figure 7:
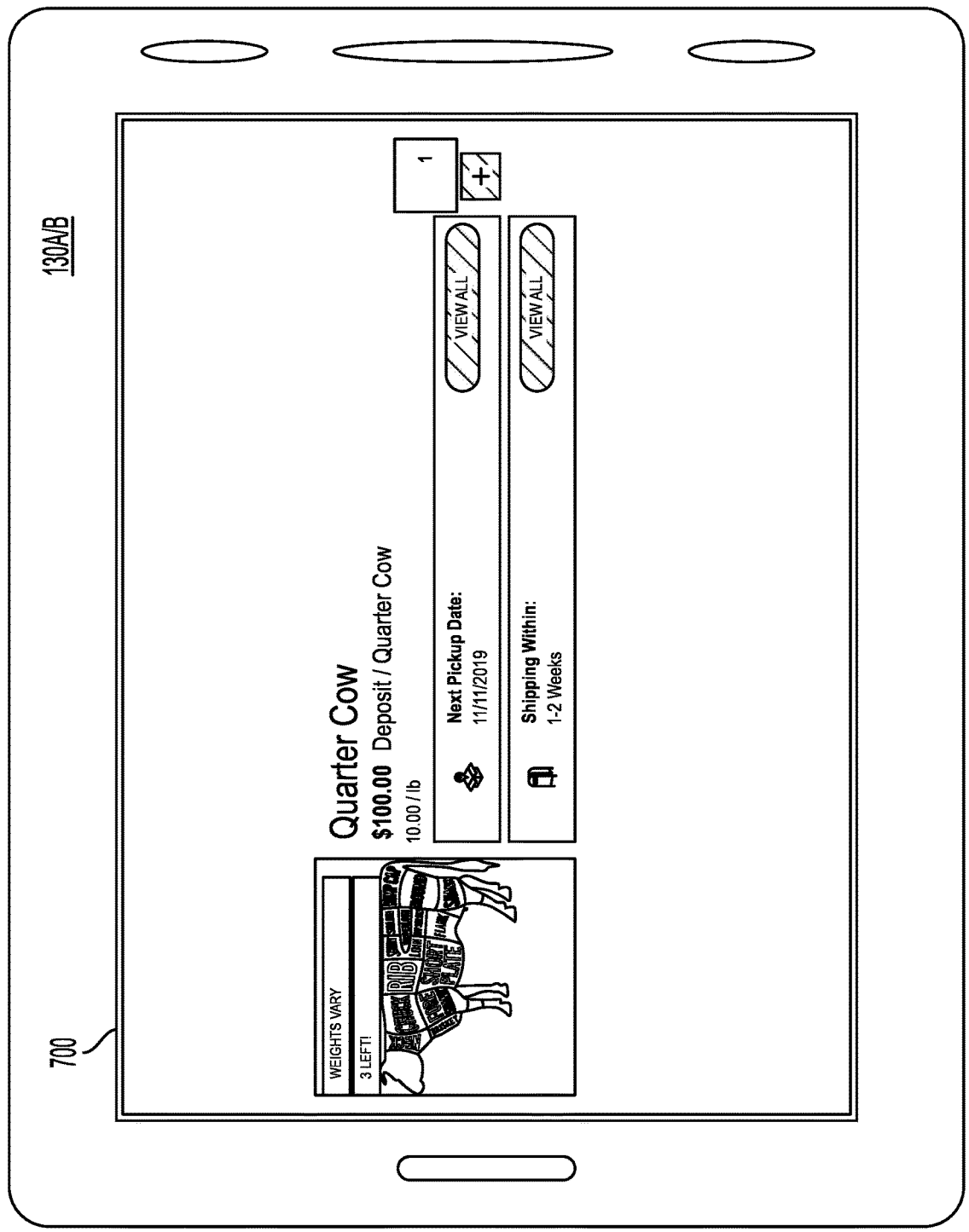
Figure 8:
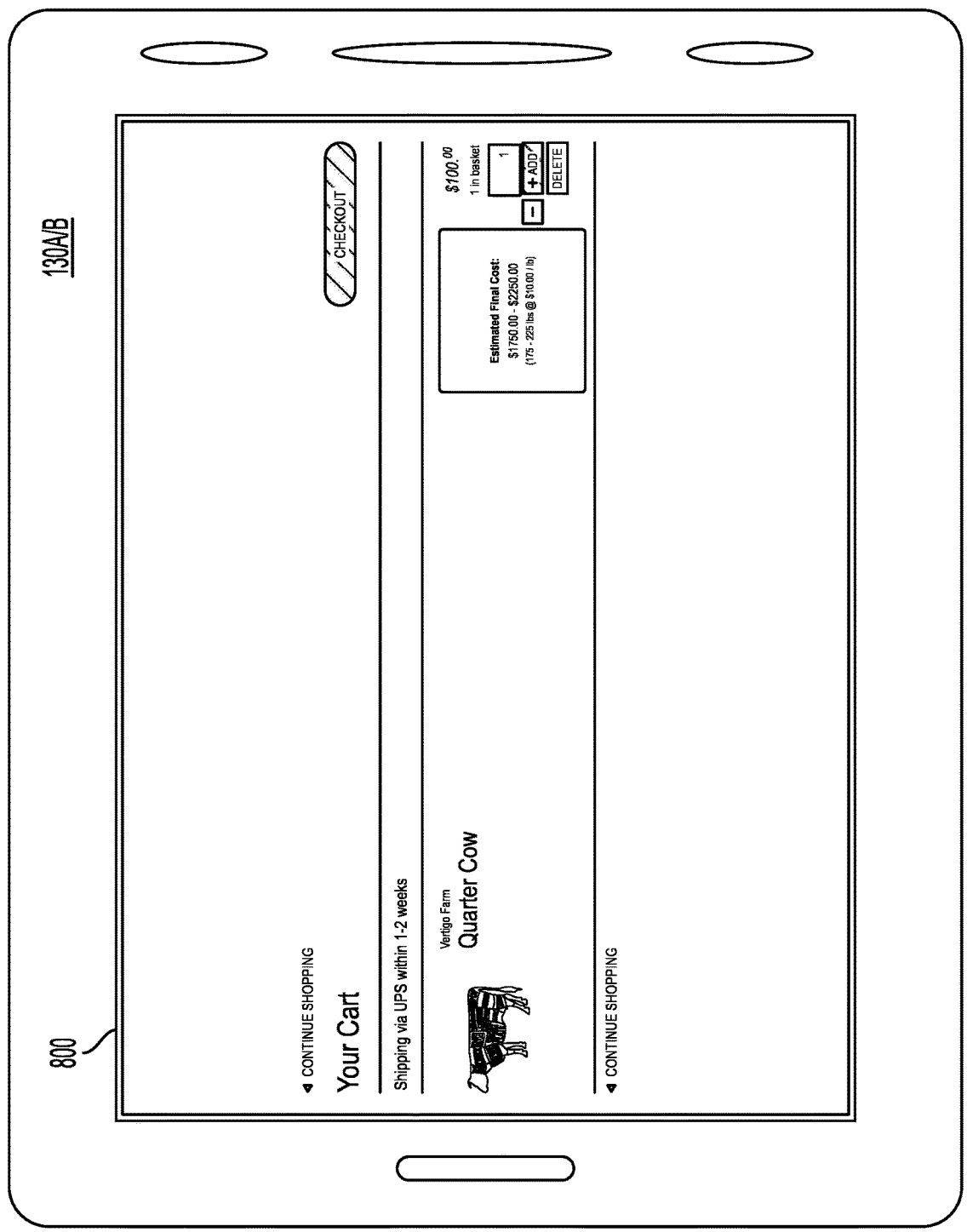

At a later time, the processor may receive an order from a buyer device to purchase the added agricultural product (block 510). When receiving such an order, a user interface 700 (shown in FIG. 7) for the buyers (provided by buyer interface 214) may display information about the agricultural product (e.g., quarter cow), a selected quantity to purchase, a remaining number of products, required deposit amount, price per unit (e.g., $10/lb), pickup date, and/or estimated shipping period, as shown in FIG. 7. The buyer may be able to select the number of agricultural products that the buyer wants to purchase. A buyer user interface 800 may also display the estimated final cost depending on the selected number of products to be purchased, as shown in FIG. 8.

Figure 9:
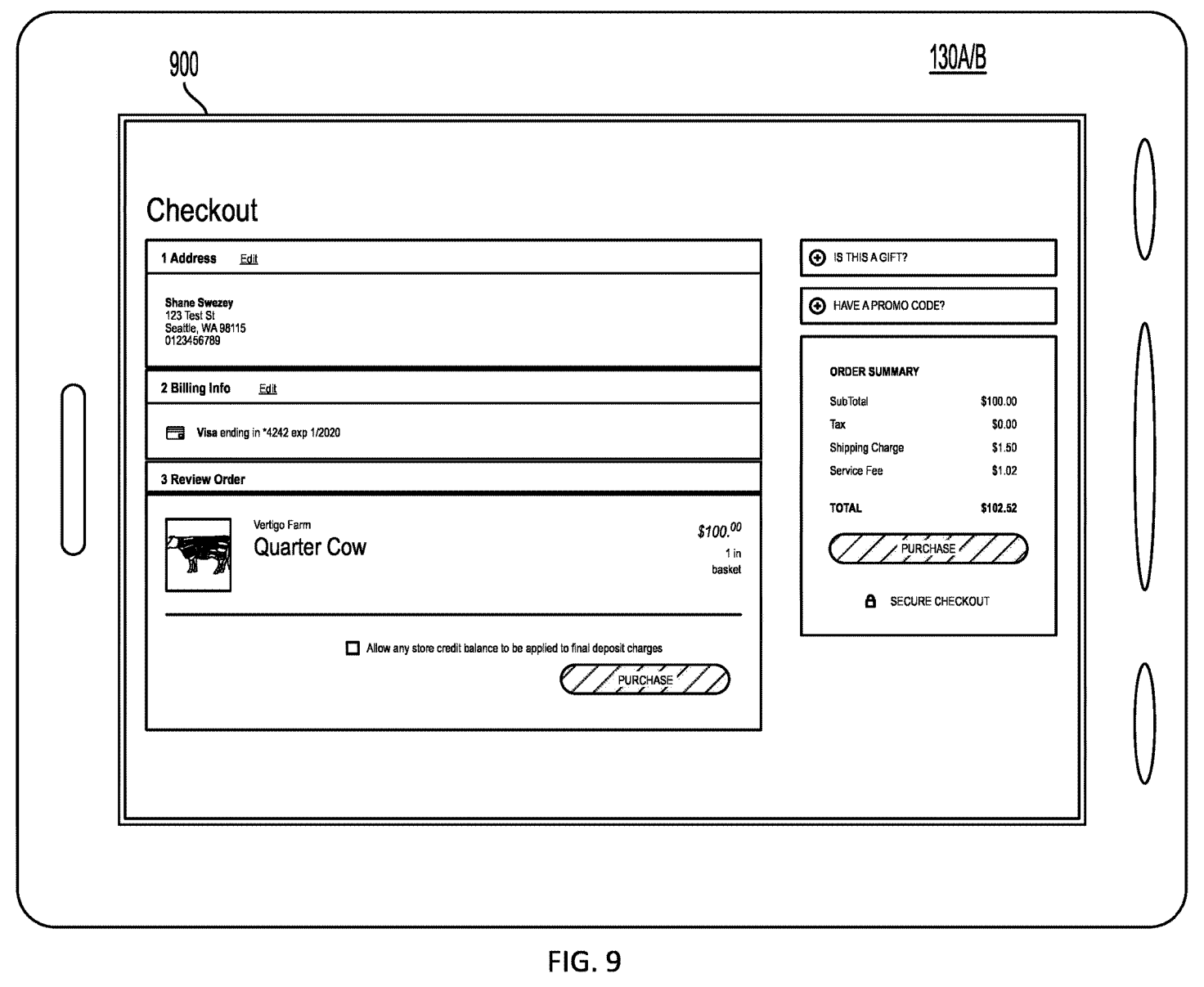
Figure 10:
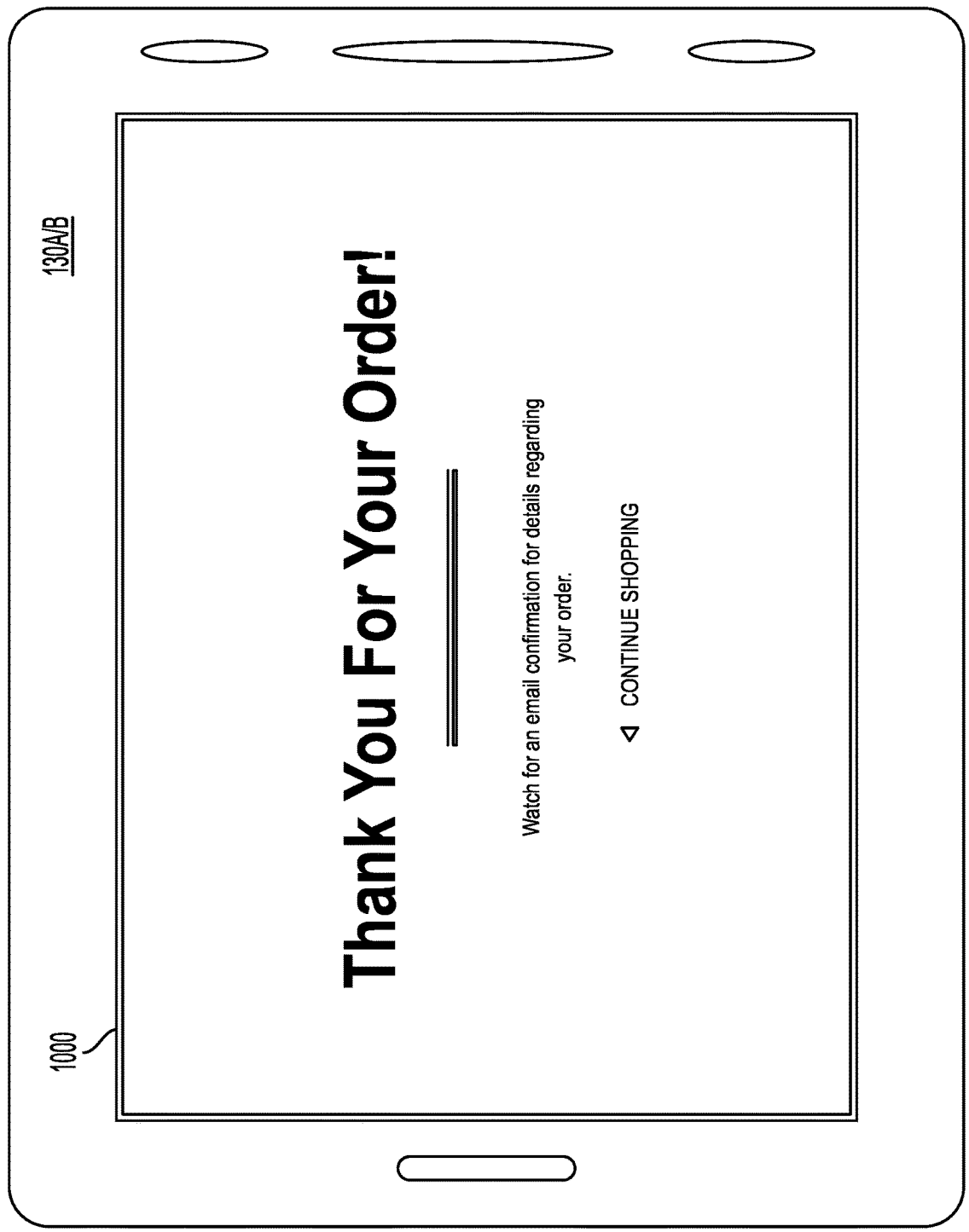

Then, in some examples, the processor may receive a payment through a physical payment option (block 515). For example, the processor may cause the deposit payment to be made through a physical payment option (e.g., by check or cash). In this case, if the deposit payment (check/cash) is not received within a predetermined amount of time (e.g., within 3 days, 5 days, 7 days), the order may be cancelled. In other examples, the processor may receive a payment through a digital payment option (block 520). For example, the processor may receive a deposit payment from the application 150/website via a buyer user interface 900, as shown in FIG. 9. The buyer user interface 900 may provide the buyer an option of applying any credit to be applied to the deposit charges including a bank transfer or payment through a payment processor or cryptocurrency account. The buyer user interface 900 may also display an order summary for the deposit payment. Once the order is successfully made and the deposit is paid, a buyer user interface 1000 may be provided by the buyer interface 214 to display an order confirmation page, as shown in FIG. 10.

Figure 11:
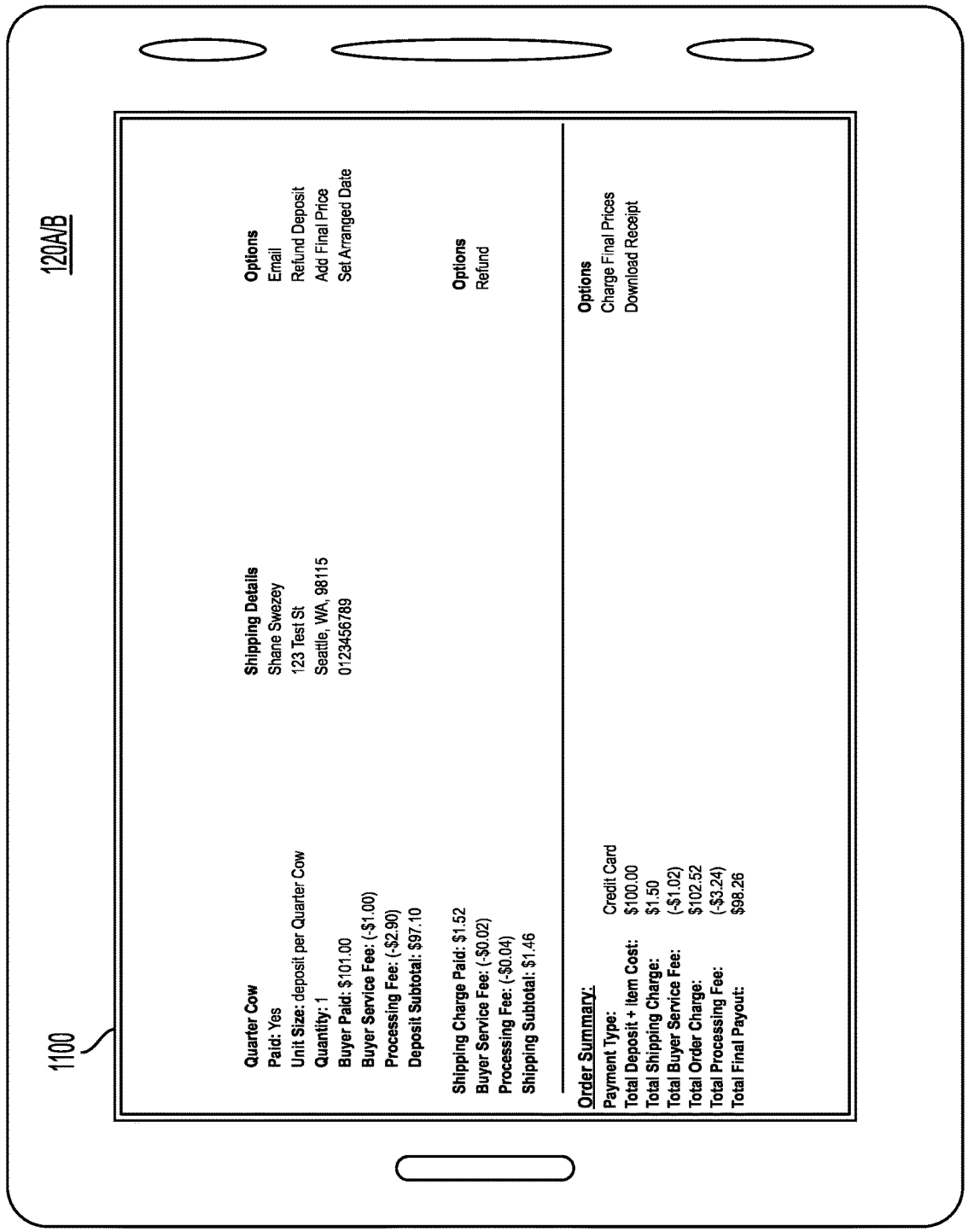
FIG. 11 shows a diagram of a user interface for vendors that enable vendors to check the payment information of the agricultural products before the final total price or weight information becomes available, according to an example embodiment of the present disclosure.

The processor may tokenize the digital payment, for example, by creating a transaction token for the deposit amount (block 525). The processor may also store a status of the order at the time of purchase (block 530). The processor may compute and display the order summary at this stage, as shown in user interface 1100 of FIG. 11.

Figure 12:
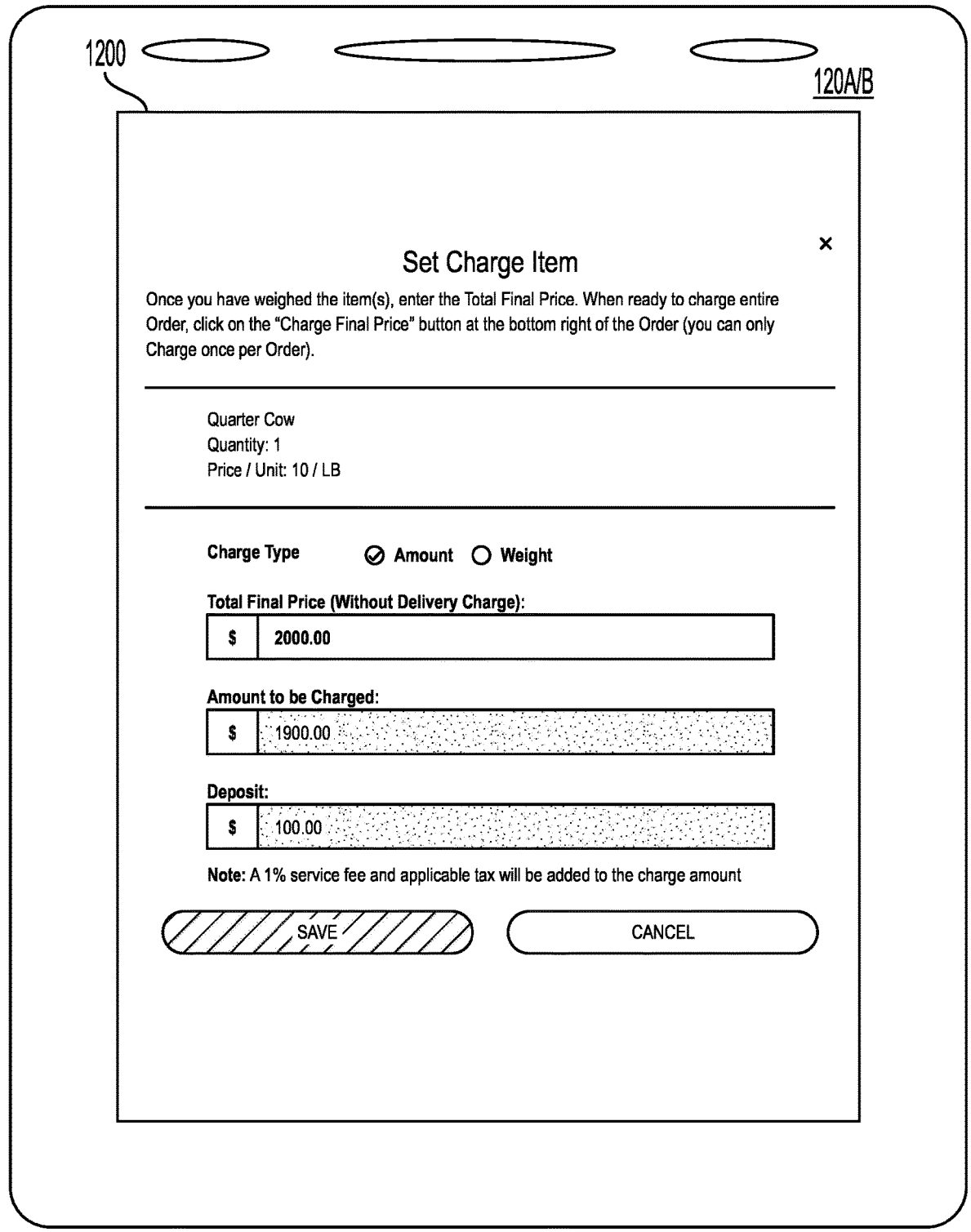
FIGS. 12 and 13 show diagrams of user interfaces for vendors that enable vendors to input total final price or weight information, according to an example embodiment of the present disclosure.
Figure 13:
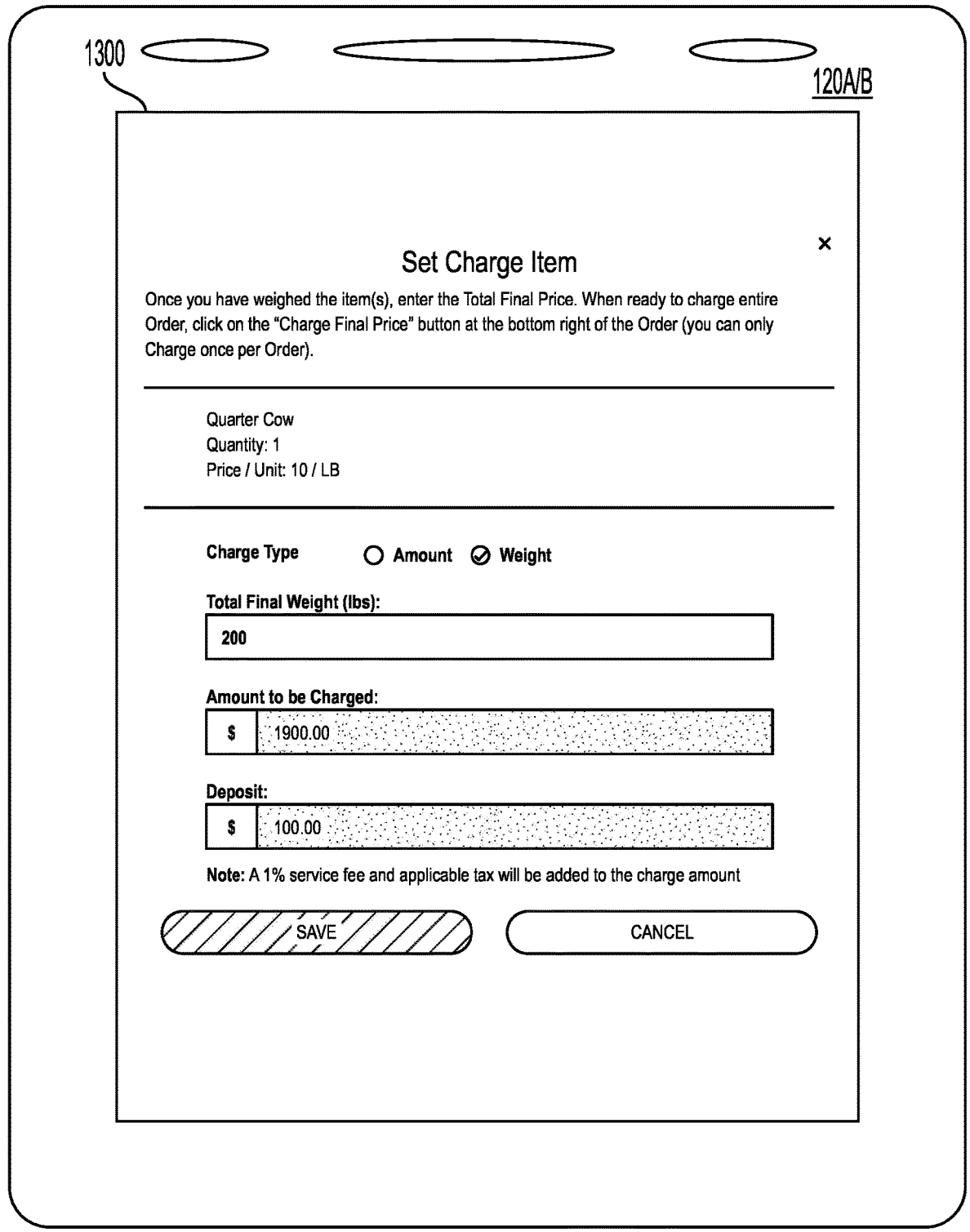

Next, the processor may receive a total unit amount or a final price from the vendor device after the agricultural product is grown, harvested, butchered, or otherwise ready for shipment (block 535). The vendor interface 212 may provide one or more user interfaces 1200 and 1300 (shown respectively in FIGS. 12 and 13) that enables the vendors to choose among different charge types to complete the transaction. This step may occur days to weeks or months after the initial deposit was processed. The charge types may include a total unit amount (e.g., weight) or a total final price. When the final price is selected, the vendor is required to input the final price of the target agricultural product, as shown in the user interface 1200 of FIG. 12. The vendor may determine the final price by calculating it manually (e.g., multiplying the price per unit of the target agricultural product by the total unit amount) or based on auction prices. In some instances, the processor may compare the final price to a range of acceptable final prices using the previously recorded price per unit and maximum/minimum number of units. If the final price is outside of the calculated range, the processor may instead prompt the vendor to enter the final unit amount, as shown in FIG. 13. Alternatively, the processor may prompt the vendor to validate the final price or provide an explanation as to why the final price is outside of an expected range. When the final weight is selected, the vendor is prompted to input the total final unit amount (e.g., weight) of the target agricultural product, as shown in the user interface 1300 of FIG. 13. Entry of the final unit amount causes the processor to automatically determine the amount to be charged based on the previously agreed price per unit.

Figure 14:
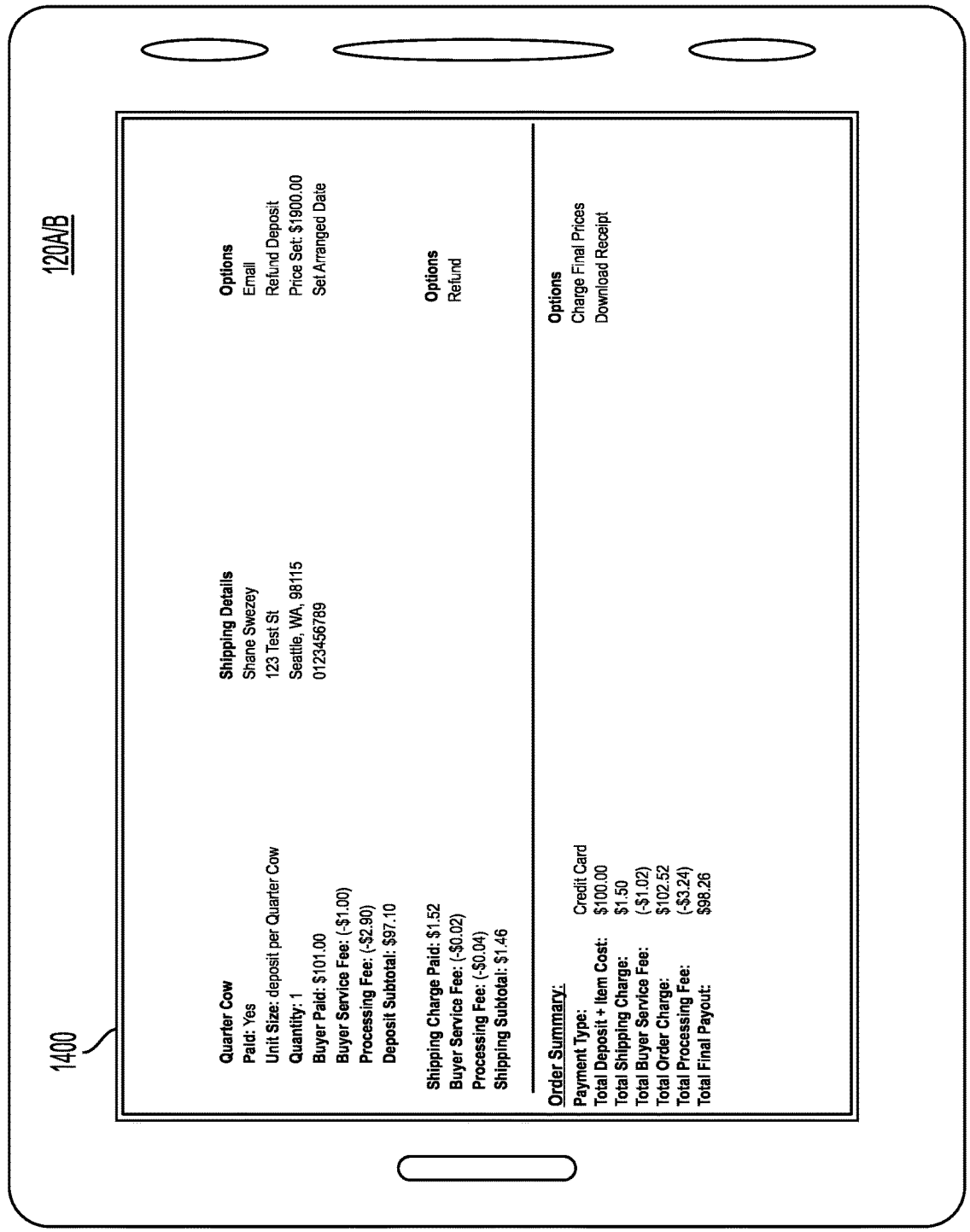
FIG. 14 shows a diagram of a user interface for vendors that enable vendors to check the payment information after the final total price or weight information becomes available but before computing other fees, according to an example embodiment of the present disclosure.
Figure 18:
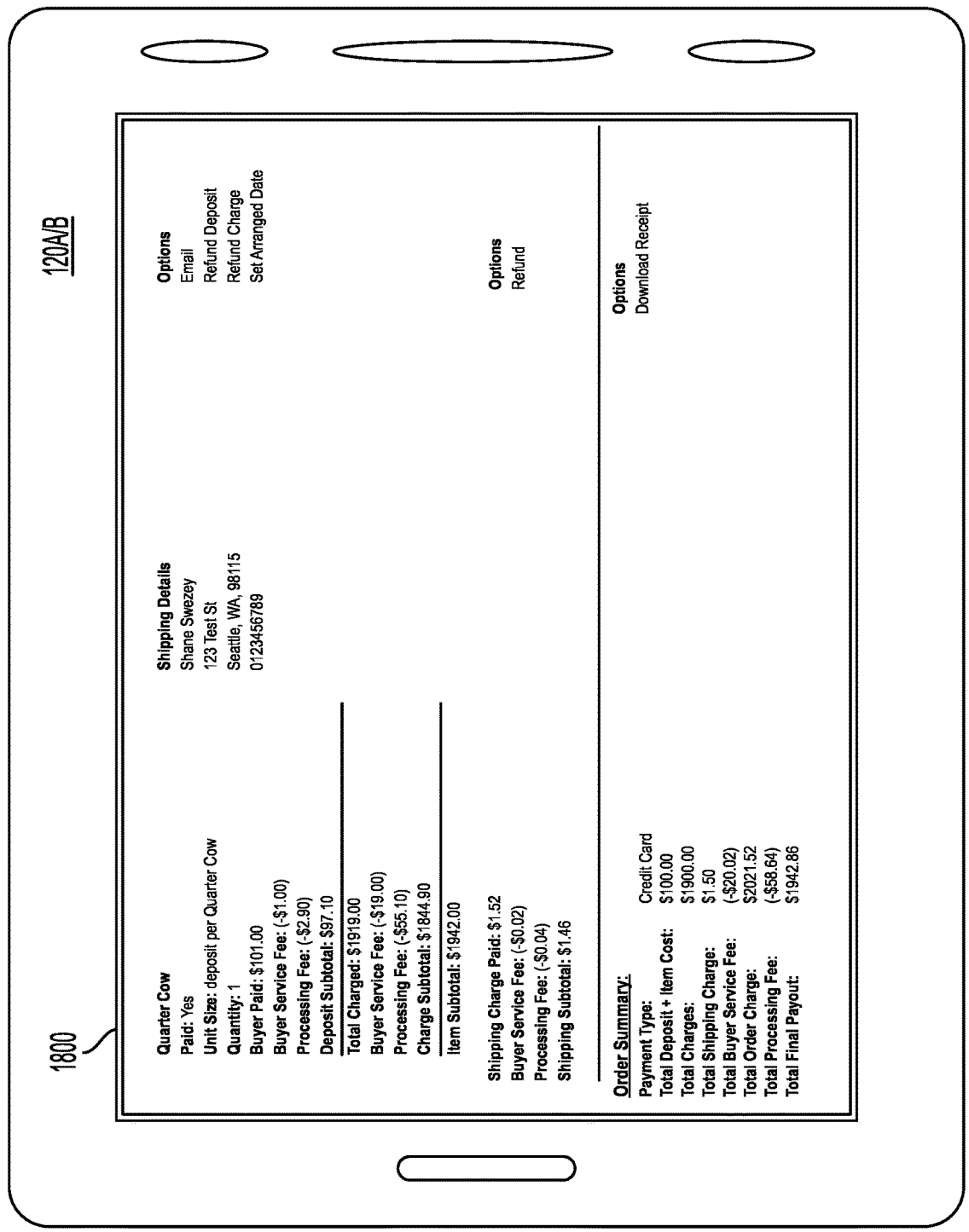
FIG. 18 shows a diagram of a user interface for vendors that enables vendors to check the final payment/charge information.

Then, the processor may finalize the order (block 540). For example, as discussed above, the processor may compute the total amount owed by the buyers by accessing the transaction token or the transaction record (e.g., deposit message, final message, order tracking message). For example, the processor may multiply the price per unit of the target agricultural product by the total unit amount to obtain the final total price. The processor may further subtract the deposit amount from the final price. As shown in user interface 1400 of FIG. 14, the vendor interface 212 may display a preliminary summary of the order, including the price difference between the final price and the deposit amount (e.g., $1,900) after the final total price or weight information becomes available but before computing other fees. The processor may adjust the total amount owed by adding or subtracting other fees (e.g., shipping fees, processing fees, butchering fees, service fees, taxes, other credits, etc.). The vendor interface 212 may cause a user interface 1800 (of FIG. 18) to display a complete summary of the order after the computation is completed in consideration of other fees.

Figure 15:
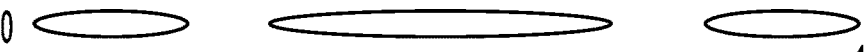
FIGS. 15 to 16 show diagrams of user interfaces for vendors that enable vendors to charge or invoice the total amount owed, according to an example embodiment of the present disclosure.
Figure 16:
Figure 17:
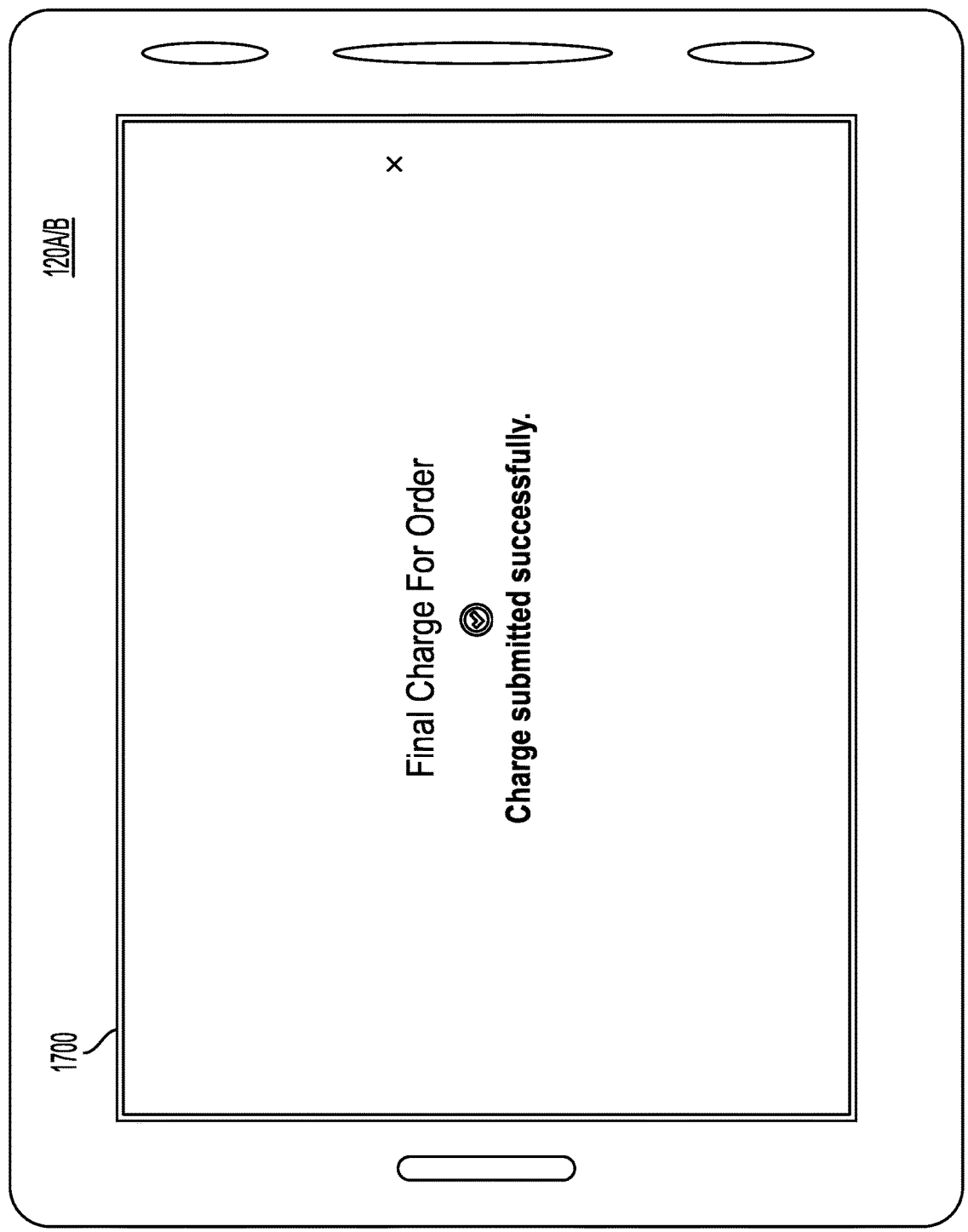
FIG. 17 shows a diagram of a user interface for vendors that indicates that a final charge request is submitted successfully.

In some examples, the processor may generate an invoice (block 545). In other examples, the processor may charge the buyer immediately (block 550). For example, the processor may charge the buyer immediately by using previously stored payment information (e.g., credit card information) provided for the initial deposit. As shown in user interfaces 1500 and 1600 respectively of FIGS. 15 and 16, the vendor interface 212 may prompt the vendors to choose a charge type between "charge now" and "invoice." Once the charge request is submitted, the vendor interface 212 may generate a charge confirmation page, as shown in user interface 1700 of FIG. 17. The example processor then concludes the transaction associated with the procedure 500. Concluding the transaction may include causing the purchased agricultural products to be shipped or otherwise provided to the buyer. This may include generating an email or other electronic communication (which may include a confirmation code) with instructions and/or directions for the buyer to acquire the purchased products. In other instances, the processor may cause a shipping label to be generated and/or place an order with a shipping company for transfer of the purchased agriculture products to the buyer. The processor may further send an electronic communication to the vendor with shipping instructions.

It will be appreciated that each of the systems, structures, methods and procedures described herein may be implemented using one or more computer program or component. These programs and components may be provided as a series of computer instructions on any conventional computer-readable medium, including random access memory ("RAM"), read only memory ("ROM"), flash memory, magnetic or optical disks, optical memory, or other storage media, and combinations and derivatives thereof. The instructions may be configured to be executed by a processor, which when executing the series of computer instructions performs or facilitates the performance of all or part of the disclosed methods and procedures.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims. Moreover, consistent with current U.S. law, it should be appreciated that 35 U.S.C. 112(f) or pre-AIA 35 U.S.C. 112, paragraph 6 is not intended to be invoked unless the terms "means" or "step" are explicitly recited in the claims. Accordingly, the claims are not meant to be limited to the corresponding structure, material, or actions described in the specification or equivalents thereof.

The invention is claimed as follows:

1. An apparatus comprising:
   a memory device configured to store a data structure that includes product information of at least one vendor, wherein the product information includes information of variable weighted and variable priced agricultural products, wherein the variable weighted and variable priced agricultural products comprise products offered for sale by a farmer, a fisherman, a rancher, a breeder, or a forager, and wherein the product information includes a product description, at least one price per unit of the variable weighted and variable priced agricultural products, and an estimated range of units for the variable weighted and variable priced agricultural products;
   an interface controller configured to provide interactive interfaces for buyer devices or vendor devices to enable at least one vendor or at least one buyer to display, sell, or buy the variable weighted and variable priced agricultural products; and a processor in communication with the memory device and the interface controller, wherein the processor in cooperation with the interface controller is configured to:
- receive or determine an estimated range of units of a target agricultural product,
- receive or determine a price per unit of the target agricultural product,
- create at least one interactive interface provided by the interface controller for purchasing the target agricultural product from a vendor, the at least one interactive interface comprising product information including the estimated range of units, the price per unit, an option to select a quantity of the target agricultural product, and an estimated price range based on the selected quantity, the estimated range of units, and the price per unit,
- receive from a buyer device through an application displaying the at least one interactive interface related to the vendor, a deposit message for the target agricultural product, the deposit message including an identification of the target agricultural product, a deposit amount, an identifier of the buyer, an identification of the vendor, the price per unit, and the estimated range of units for the target agricultural product, wherein the deposit message is received at a first time before the target agricultural product has been harvested, butchered, grown, captured, or processed,
- receive an indication of a completed digital payment that is related to the deposit message, the indication specifying that the deposit amount has been transferred from an account of the buyer to an account of the vendor,
- create a transaction token to tokenize the digital payment, the transaction token including at least the identification of the target agricultural product, the deposit amount, the price per unit, and the estimated range of units for the target agricultural product,
- store to the data structure of the memory device the transaction token,
- at a second time after the first time, receive a fulfillment message from a vendor device of the vendor that is indicative that the target agricultural product has been harvested, butchered, grown, captured, or processed, the fulfillment message including a total unit amount,
- compute a total amount owed by accessing only the transaction token, and multiplying the price per unit of the target agricultural product by the total unit amount and subtracting the deposit amount,
- transmit a transaction completion message to the buyer device that is indicative of the total amount owed,
- receive a final payment message from the buyer device for the total amount,
- cause the total amount to be transferred from the account of the buyer to the account of the vendor, and
- cause the total unit amount of the target agricultural product to be provided to the buyer.

2. The apparatus of claim 1, wherein the deposit message includes a desired number of units that is less than the estimated range of units, and wherein the processor is configured to instead determine the total amount owed by multiplying the price per unit of the target agricultural product by the desired number of units and subtracting the deposit amount.

3. The apparatus of claim 2, wherein the processor causes the desired number of units to be provided to the buyer.

4. The apparatus of claim 1, wherein the estimated range of units for the target agricultural product includes a minimum weight and a maximum weight.

5. The apparatus of claim 1, wherein the deposit message is created in response to receiving an order for the target agricultural product through the application, and the deposit message is generated by creating a first multi-dimensional tuple for the order, wherein the multi-dimensional tuple includes information about the identification of the target agricultural product, the deposit amount, the identifier of the buyer, the identification of the vendor, the price per unit, and the estimated range of units for the target agricultural product.

6. The apparatus of claim 5, wherein, in response to receiving the fulfillment message, the processor is configured to create a second multi-dimensional tuple for the order, wherein the second multi-dimensional tuple includes information about the identification of the target agricultural product, the deposit amount, the identifier of the buyer, the identification of the vendor, the price per unit, the estimated range of units, and the total unit amount for the target agricultural product.

7. The apparatus of claim 1, wherein the processor is configured to:
- monitor a market price for the variable weighted and variable priced agricultural products, wherein the market price is a price inputted by a plurality of vendors using the apparatus, for the agricultural products for a predetermined period of time; and
- provide a recommended range of price per unit for the variable weighted and variable priced agricultural products based on the monitored market price.

8. The apparatus of claim 1, wherein the processor is configured to:
- determine whether a desired number of units received from the buyer device is within the estimated range of units; and
- in response to determining that the desired number of units is not within the estimated range of units, provide an error message to the buyer device.

9. The apparatus of claim 1, wherein the processor is configured to:
- determine whether an agricultural product inputted by the vendor device is a banned agricultural product; and
- in response to determining that the agricultural product is the banned item, provide an error message to the vendor device.

10. The apparatus of claim 9, wherein the processor determines whether the agricultural product inputted by the vendor device is the banned agricultural product by comparing the inputted agricultural product with a banned agricultural product list.

11. The apparatus of claim 10, wherein the banned agricultural product list varies depending on a geographical location of the vendor device or the buyer device.

12. The apparatus of claim 1, wherein the processor is configured to lock the price per unit of the target agricultural product in response to receiving an order from the buyer device.

13. The apparatus of claim 1, wherein the price per unit comprises price per weight, price per crate, or price per pallet.

14. A method to be performed by an apparatus including a memory device configured to store a data structure that includes product information of at least one vendor, wherein the product information includes information of variable weighted and variable priced agricultural products, wherein the variable weighted and variable priced agricultural products comprise products offered for sale by a farmer, a fisherman, a rancher, a breeder, or a forager, and wherein the product information includes a product description, at least one price per unit of the variable weighted and variable priced agricultural products, and an estimated range of units for the variable weighted and variable priced agricultural products; an interface controller configured to provide interactive interfaces for buyer devices or vendor devices to enable at least one vendor or at least one buyer to display, sell, or buy the variable weighted and variable priced agricultural products; and a processor in communication with the memory device and the interface controller, wherein the method comprises:

receiving or determining an estimated range of units of a target agricultural product;

receiving or determining a price per unit of the target agricultural product;

creating at least one interactive interface provided by the interface controller for purchasing the target agricultural product from a vendor, the at least one interactive interface comprising product information including the estimated range of units, the price per unit, an option to select a quantity of the target agricultural product, and an estimated price range based on the selected quantity, the estimated range of units, and the price per unit;

receiving from a buyer device through an application displaying the at least one interactive interface related to the vendor, a deposit message for the target agricultural product, the deposit message including an identification of the target agricultural product, a deposit amount, an identifier of the buyer, an identification of the vendor, the price per unit, and the estimated range of units for the target agricultural product, wherein the deposit message is received at a first time before the target agricultural product has been harvested, butchered, grown, captured, or processed;

receiving an indication of a completed digital payment that is related to the deposit message, the indication specifying that the deposit amount has been transferred from an account of the buyer to an account of the vendor;

creating a transaction token to tokenize the digital payment, the transaction token including at least the identification of the target agricultural product, the deposit amount, the price per unit, and the estimated range of units for the target agricultural product;

storing to the data structure of the memory device the transaction token;

at a second time after the first time, receiving a fulfillment message from a vendor device of the vendor that is indicative that the target agricultural product has been harvested, butchered, grown, captured, or processed, the fulfillment message including a total unit amount;

computing a total amount owed by accessing only the transaction token, and multiplying the price per unit of the target agricultural product by the total unit amount and subtracting the deposit amount;

transmitting a transaction completion message to the buyer device that is indicative of the total amount owed;

receiving a final payment message from the buyer device for the total amount;

causing the total amount to be transferred from the account of the buyer to the account of the vendor; and causing the total unit amount of the target agricultural product to be provided to the buyer.

15. The method of claim 14, wherein the deposit message includes a desired number of units that is less than the estimated range of units, and wherein the method further comprises instead determining the total amount owed by multiplying the price per unit of the target agricultural product by the desired number of units and subtracting the deposit amount.

16. The method of claim 15, further comprising causing the desired number of units to be provided to the buyer.

17. The method of claim 14, wherein the estimated range of units for the target agricultural product includes a minimum weight and a maximum weight.

18. The method of claim 14, further comprising:

monitoring a market price for the variable weighted and variable priced agricultural products, wherein the market price is a price inputted by a plurality of vendors using the apparatus, for the agricultural products for a predetermined period of time; and providing a recommended range of price per unit for the variable weighted and variable priced agricultural products based on the monitored market price.

19. The method of claim 14, further comprising locking the price per unit of the target agricultural product in response to receiving an order from the buyer device.

20. The method of claim 14, wherein the price per unit comprises price per weight, price per crate, or price per pallet.

* * * * *